US008936721B2

(12) United States Patent
Renaud et al.

(10) Patent No.: US 8,936,721 B2
(45) Date of Patent: Jan. 20, 2015

(54) UNITARY FILTER TANK AND AN UNDERDRAIN FOR FILTERING A BODY OF WATER

(75) Inventors: Benoit Joseph Renaud, Clemmons, NC (US); Alan R. Levin, Winston-Salem, NC (US); Michael Andrew Liberti, Clemmons, NC (US)

(73) Assignee: Hayward Industries, Inc., Elizabeth, NJ (US)

( * ) Notice: Subject to any disclaimer, the term of this patent is extended or adjusted under 35 U.S.C. 154(b) by 440 days.

(21) Appl. No.: 13/204,377

(22) Filed: Aug. 5, 2011

(65) Prior Publication Data
US 2013/0032517 A1 Feb. 7, 2013

(51) Int. Cl.
| | |
|---|---|
| C02F 1/00 | (2006.01) |
| B01D 24/42 | (2006.01) |
| B29C 47/00 | (2006.01) |
| B29C 49/04 | (2006.01) |
| C02F 103/42 | (2006.01) |
| B29C 49/48 | (2006.01) |
| B29C 49/58 | (2006.01) |

(52) U.S. Cl.
CPC ............ *C02F 1/004* (2013.01); *B29C 47/0023* (2013.01); *B29C 47/0054* (2013.01); *B29C 49/04* (2013.01); *B01D 24/42* (2013.01); *C02F 2103/42* (2013.01); *B29C 49/4817* (2013.01); *B29C 2049/047* (2013.01); *B29C 2049/5855* (2013.01); *B29C 2049/5886* (2013.01)
USPC ....................... 210/167.13; 210/232; 210/288

(58) Field of Classification Search
CPC ..... C02F 1/004; B01D 24/42; B29C 47/0023; B29C 47/0054; B29C 49/04; B29C 49/4817; B29C 2049/047; B29C 2049/5855; B29C 2049/5886

USPC ........... 210/167.12, 167.13, 167.14, 232, 288
See application file for complete search history.

(56) References Cited

U.S. PATENT DOCUMENTS

| | | | |
|---|---|---|---|
| 3,245,540 A | | 4/1966 | Johnson |
| 3,381,823 A | * | 5/1968 | Nash .............................. 210/279 |
| 3,625,365 A | * | 12/1971 | Armstrong et al. ........... 210/232 |
| 3,679,054 A | | 7/1972 | Muller |
| 3,747,768 A | * | 7/1973 | Barrera ......................... 210/288 |
| 3,767,050 A | * | 10/1973 | Reiner ..................... 210/167.13 |
| 3,949,034 A | | 4/1976 | Uhlig |
| 4,036,926 A | | 7/1977 | Chang |

(Continued)

FOREIGN PATENT DOCUMENTS

WO    WO 2005/040501 A1    5/2005

OTHER PUBLICATIONS

International Search Report and Written Opinion dated Nov. 29, 2012, in connection with International Patent Application PCT/US2012/049021 (9 pages).

*Primary Examiner* — Fred Prince
(74) *Attorney, Agent, or Firm* — McCarter & English, LLP

(57) ABSTRACT

Exemplary embodiments include a unitary pool filter tank and/or an underdrain for a pool filter unit. Embodiments of the unitary pool filter tank can have an integrally formed housing and base. The filter tank can be formed using a blow molding process in which the base of the filter tank is reinforced using multiple polymer layers that have been folded and/or pinched together. Embodiments of the underdrain can be formed by interlocking top and bottom components. The top and bottom components can be interlocked by inter-component locking structures.

11 Claims, 30 Drawing Sheets

(56) References Cited

U.S. PATENT DOCUMENTS

| | | |
|---|---|---|
| 4,102,790 A | 7/1978 | Portyrata |
| 4,122,011 A | 10/1978 | Strigle, Jr. |
| 4,216,798 A | 8/1980 | Tscherner |
| 4,465,199 A | 8/1984 | Aoki |
| 4,478,716 A | 10/1984 | Hasegawa et al. |
| 4,657,673 A | 4/1987 | Kessler |
| 4,678,577 A | 7/1987 | Thomas et al. |
| 4,753,726 A | 6/1988 | Suchanek |
| 5,028,322 A | 7/1991 | Soriente |
| 5,055,186 A | 10/1991 | Van Toever |
| 5,068,033 A | 11/1991 | Tobias et al. |
| 5,205,932 A | 4/1993 | Solomon et al. |
| 5,882,531 A | 3/1999 | Cohen |
| 6,447,675 B1 | 9/2002 | James |
| 6,605,211 B1 | 8/2003 | Slopack |
| 7,081,200 B2 | 7/2006 | Planas Valls |
| 7,217,363 B2 | 5/2007 | Mulvey |
| 7,468,134 B2 | 12/2008 | Hoang |
| 7,794,591 B2 | 9/2010 | Nibler et al. |
| 2001/0032813 A1* | 10/2001 | Savage ............ 210/274 |
| 2010/0072117 A1 | 3/2010 | Swain |

* cited by examiner

UNITARY FILTER TANK AND AN UNDERDRAIN FOR FILTERING A BODY OF WATER

BACKGROUND

1. Field of Technology

Exemplary embodiments include a unitary filter tank and/or an underdrain for a filtering a body of water.

2. Brief Discussion of Related Art

Swimming pools often use sand filter units to remove particulate and gelatinous contaminants from pool water. A typical sand filter unit includes a filter tank, a separate base unit upon which the filter tank rests, an underdrain assembly disposed within and towards a bottom of the filter tank, and a water circulation system to circulate water through the filter unit. Once the underdrain assembly is in place within the filter tank, the filter tank is filled with sand, which covers the underdrain assembly. In a typical implementation, pool water enters the filter tank towards a top end via the water circulation system and percolates through the sand to the underdrain assembly, which collects cleansed pool water for recirculation in the pool by the water circulation system.

FIG. 50 is an example of a conventional sand filter tank assembly 5000 having a filter tank 5010 with a separate base 5050. The filter tank 5010 has an opening 5012 at a top end 5014 of the filter tank 5010 and interface structures 5016 at a bottom end 5018. The opening 5012 facilitates communication between an interior and exterior of the filter tank 5010 for the water circulation system. The interface structures 5016 can be configured for mounting the filter tank 5010 on the base 5050. The base 5050 includes interface structures 5052 for receiving the interface structures 5016 of the filter tank 5010. In operation, the filter tank 5010 rests on the base 5050 and is subsequently filled with a filtrate material.

FIGS. 51-55 show an example conventional filter tank manufacturing system 6000 and process for forming the filter tank 5010 of FIG. 50. The system 6000 can include an extrusion head 6100, a mold 6200 operatively coupled to a press 6300, and a blow pin 6400. The mold 6200 can be partitioned into two sections and can be moveable between an open and closed position by the press 6300. To form the filter tank, molten polymer parison 6110 is extruded between the mold sections by the extrusion head 6100 when the mold 6200 is in the open position. Once a sufficient amount of molten polymer parison 6110 has been extruded, the press 6300 can urge the opposing sections of the mold 6200 together so that the mold 6200 is in the closed position. In the closed position, the molten polymer parison 6110 is pinched at the ends of the mold 6200 to form a molten polymer body 6120. The blow pin 6400 can be introduced into the mold 6200 and into an interior area of the molten polymer body 6120 and can blow or force air into the molten polymer body 6120 to expand the molten polymer body 6120 outward towards contoured surfaces of the mold 6200 until the molten polymer body conforms to the mold. The blow pin 6400 can continue to blow air to cool and harden the molten polymer body. Once the molten polymer body 6120 has been sufficiently cooled and hardened, the mold 6200 is opened to release the newly formed filter tank.

With respect to the underdrain assembly of a filter unit, several configuration have been implemented. In one common implementation, a underdrain assembly can have several separate parts that can be coupled to form the underdrain assembly during installation of the underdrain assembly in a filter tank. Reference is also made, for example, to U.S. Pat. No. 5,068,033, the contents of which are incorporated herein by reference for all purposes.

SUMMARY

In one aspect, a method of forming a unitary filter tank having an integral housing and base is disclosed. The unitary filter tank can be configured to filter pool water using sand and includes forming a molten polymer body with a mold. The mold includes a housing formation area to form the housing of a unitary filter tank, a base formation area to form the base of the unitary filter tank, and transition points separating the housing formation area from the base formation area. The method also includes forcing air into the molten polymer body to urge the molten polymer body to conform to the mold and folding at least two layers of the molten polymer body together in the base formation area to form a support structure of the base of the unitary pool filter tank.

In another aspect, a unitary filter tank has an integrally formed housing and base, in which the base includes a support structure formed by at least two polymer layers, wherein the unitary filter tank can be configured to filter pool water using sand and is formed according to a method that includes forming a molten polymer body with a mold, forcing air into the molten polymer body to urge the molten polymer body to conform to the mold, and folding at least two layers of the molten polymer body together in the base formation area to form a support structure of the base. The mold having a housing formation area to form the housing of the unitary filter tank, a base formation area to form the base of the unitary filter tank, and transition points separating the housing formation area from the base formation area.

In another aspect, a unitary filter tank having an integrally formed housing and base is disclosed. The unitary filter tank can be configured to filter pool water using sand. The housing is configured to receive a filtrate material. The base includes a punted section and a support structure. The punted section forms a convex inner wall portion of the unitary filter tank. The support section integrally connects the punted section to the housing and is formed of a least two polymer layers folded together.

In another aspect, a system for forming a unitary filter tank is disclosed. The system can include a mold having an open position to receive a molten polymer parison and a closed position to form a molten polymer body from the molten polymer parison. The mold includes a housing formation area having housing formation molders, a base formation area having base formation molders, and transition points separating the housing formation area from the base formation area. The housing formation molders are spaced away from each other in the open position and are proximate to each other in the closed position. The base formation molders are spaced away from each other and away from the transition points in the open position. The base formation molders are proximate to each other in the closed position and are moveable toward and away from the transition points to form folded layers in the molten polymer body.

In another aspect, an underdrain for a pool filter is disclosed. The underdrain includes a first component and a second component. The second component selectively interlocks with the first component to form an interior area of the underdrain. The first and second components have a plurality of drainage openings. Each of the drainage openings open into the interior area of the underdrain and permit fluid communication between an exterior and the interior area.

In another aspect, a system for filtering water in a pool is disclosed. The system includes a unitary filter tank and an underdrain. The unitary filter tank has an integrally formed housing and base. The base includes a punted section and a support structure. The punted section forms a convex inner wall portion of the unitary filter tank. The support section integrally connects the punted section to the housing and is formed of at least two polymer layers folded together. The underdrain has interlocking first and second components. The second component selectively interlock with the first component to form an interior area of the underdrain. The first and second components have a plurality of drainage openings that open into the interior area of the underdrain and permit fluid communication between an exterior and the interior area.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 1 shows an exemplary filter unit for filtering water including, for example, water from a pool, spa, Jacuzzi, hot tub, aquaculture environment, fountain, pond, or the like.

FIG. 13 is a perspective view of an exemplary embodiment of an underdrain of the filter unit of FIG. 1.

DETAILED DESCRIPTION OF EXEMPLARY EMBODIMENTS

Exemplary embodiments of the present disclosure include a unitary filter tank and/or an underdrain for filtering water from a body of water, such as a swimming pool, hot tub, Jacuzzi, spa, aquaculture environment, pond, fountain, and the like. Embodiments of the unitary filter tank can have an integrally formed housing and base. The unitary filter tank can be formed using a blow molding process in which the base of the unitary filter tank is reinforced using multiple layers of a polymer that have been folded and/or pinched together. The base of the unitary filter tank can provide a stable durable platform to support the filter tank when the filter tank is loaded with a filtrate material, such as sand, and water. Embodiments of the underdrain can be formed by interlocking top and bottom components that can be interlocked by inter-component locking structures. Exemplary embodiments of the underdrain provide an efficiently manufactured and easy-to-install underdrain, which can reduce the cost and burden associated with conventional underdrains while maintaining performance that is comparable to some conventional underdrain assemblies.

Figure 1:
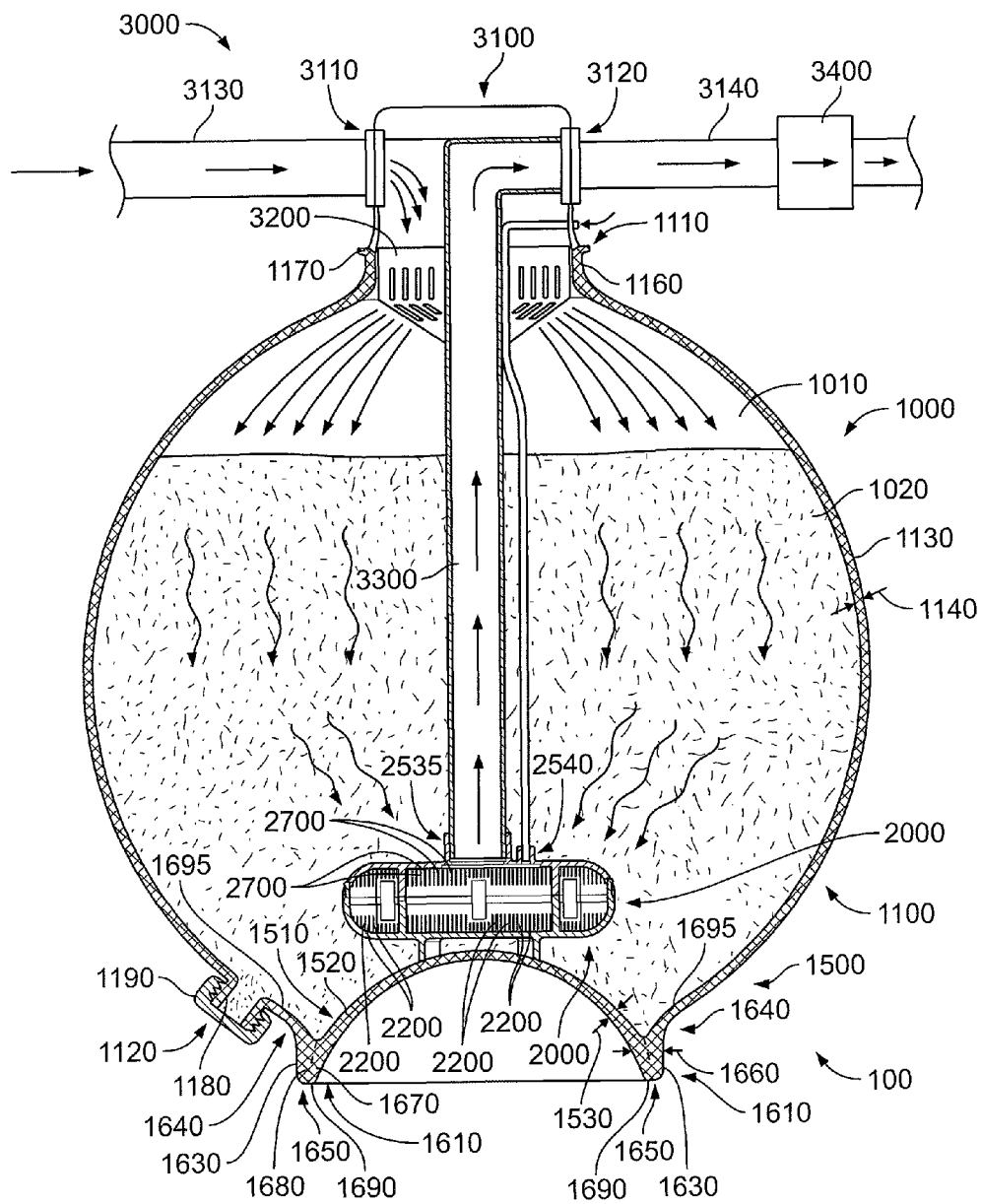

FIG. 1 shows an exemplary filter unit 100. The filter unit 100 can be configured to receive water to be filtered from a pool or other body of water and can process the water to remove contaminants and gelatinous material. After the filter unit 100 filters the water, the filtered water is returned to the pool or other body of water. The filter unit 100 can include a unitary filter tank 1000, an underdrain 2000, and a cover assembly 3000.

The filter tank 1000 can include of an integrally formed housing 1100 and a base 1500, and can define an interior area 1010 within which the underdrain 2000 and a filtrate material 1020, such as sand, can be disposed. The housing 1100 can include a first port 1110 positioned opposite of the base 1500 to facilitate communication between an interior and an exterior of the filter tank 1000. In some embodiments, the filter tank 1000 can include other ports to facilitate communication between an interior and exterior of the filter tank 1000, such as a second port 1120 disposed proximate to the base 1500 to facilitate draining of the filter tank 1000. The base 1500 can be formed to support and provide a stable platform for the filter tank 1000. In some embodiments, the filter tank 1000 can be formed from a polymer, such as a thermoplastic. For example, in some embodiments, the filter tank 1000 can be formed from high density polyethylene. The filter tank 1000 can be formed using a blow molding process in which the filter tank 1000 is formed using a gas, such as air, to shape a molten polymer body according to a mold. Exemplary embodiments of the filter tank 1000 are described in more detail below with reference to FIGS. 1-12.

The underdrain 2000 can be formed of detachably coupled components and can have drainage openings 2200 and 2700. For example, the underdrain 2000 can include two components that are selectively interlocked using inter-component locking structures, which can form a snap fit between the components. The drainage openings 2200 and 2700 can be configured to permit water to pass through to an interior of the underdrain 2000 from an exterior of the underdrain 2000, but to prevent the filtrate material 1020, such as sand, from entering the interior of the underdrain 2000. In some embodiments, the underdrain 2000 can be formed using a polymer, such as polystyrene, polypropylene, or another plastic or plastic-like material, and can have a generally rectangular configuration with rounded sides and/or corners and a generally hollow interior area. Exemplary embodiments of the underdrain 2000 are described in more detail below with references to FIGS. 1 and 13-31.

The cover assembly 3000 can include a cover 3100, a diffuser 3200, an inlet port 3110, and an outlet port 3120. The inlet port 3110 can receive water to be filtered by the filter unit 100 from a water circulation system (not shown) and the outlet port 3120 can output water that has been filtered by the filter unit 100 to the water circulation system (not shown) for recirculation. The inlet port 3110 can be operatively coupled to a conduit 3130, such as a hose, through which water to be filtered flows to the filter unit 100 from the pool or other body of water. The outlet port 3120 can be operatively coupled to a recirculation pipe 3300 to facilitate fluid communication between the underdrain 2000 and the outlet port 3120, and can be operatively coupled to conduit 3140, such as a hose, through which water that has been filtered flows from the filter unit 100 for recirculation in the pool or other body of water. The inlet port 3110 can be in communication with the diffuser 3200 such that water flowing into the cover 3100 from the pool passes through the diffuser 3200. The diffuser 3200 distributes the water at or near the top of the filter tank 1000. In some embodiments, the diffuser 3200 can be configured to distribute the water into the tank uniformly. Once the water percolates through the filtrate material 1020 and is collected by the underdrain 2000, the filtered water is drawn up through the recirculation pipe 3300 by the pump 3400, which can be in communication with the outlet port 3120.

In some embodiments, the cover assembly 3000 can implement a multi-port valve controlled by an actuator (not shown) that facilitates flow reversal of the water through the filter unit 100 to switch between a normal and backwash operation. The multi-port valve can be actuated to operatively couple the conduit 3130 to the recirculation pipe 3300 such that the conduit 3130 is in fluid communication with the recirculation pipe 3300 to implement a backwash operation.

A pump 3400, shown as being downstream of the filter unit 1000 in FIG. 1, can be configured to draw the filtered water from the filter unit 100 through the recirculation pipe 3300 and the outlet port 3120. Alternatively, or in addition, a pump (not shown) can be positioned upstream of the filter unit 100 to generate a flow of water from the pool or other body of water into the filter unit 100.

Figure 2:
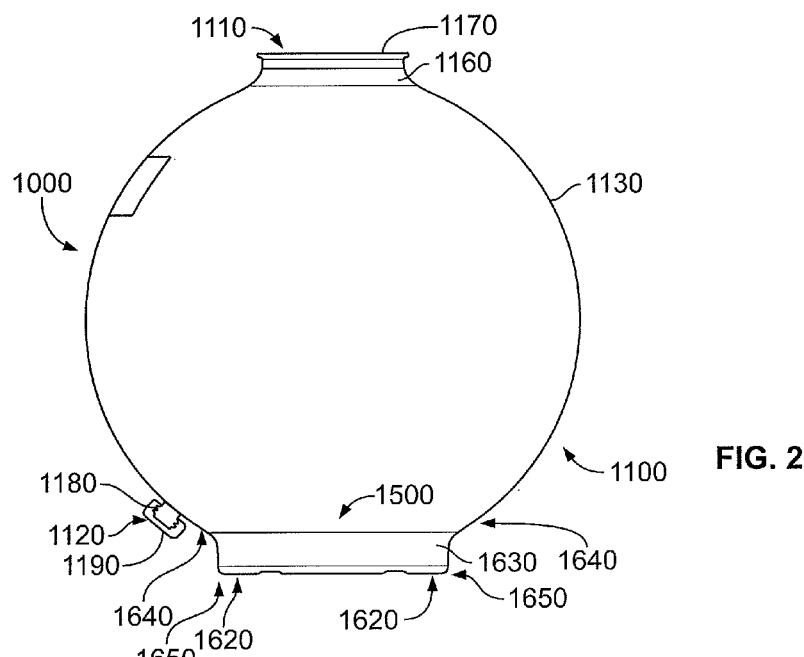
FIG. 2 is a side view of the filter tank of FIG. 1.

Referring to FIGS. 1-6, the housing 1100 of the filter tank 1000 can have a wall 1130 with a generally spherical configuration and a generally uniform wall thickness 1140 (FIG. 2). While the wall 1130 of the present embodiment is generally spherical, those skilled in the art will recognize that other configurations can be implemented. For example, in some embodiments the wall 1130 can have a generally cylindrical configuration, rectangular configuration, pear-shaped configuration, and the like. Furthermore, while the wall thickness 1140 is generally uniform, those skilled in the art will recognize that the wall thickness 1140 may vary. For example, the wall thickness 1140 can increase near the base 1500 and/or the uniformity of the wall thickness 1140 may vary due to manufacturing tolerances.

The first port 1110 can be disposed in the wall 1130 opposite the base 1500 of the filter tank 1000. The first port 1110 can allow access to an interior area 1150 of the filter tank 1000 and can provide a passageway between the interior and exterior of the filter tank 1000. A neck or collar section 1160 can provide a transition from the generally spherical shape of the housing 1100 to a generally cylindrical shape associated with the first port 1110. The collar section 1160 associated with the first port 1110 can include an interface 1170, such as a lip, gasket, threaded surface, flange, and the like, for receiving a cover to close and/or seal the first port 1110. In one implementation, the cover 3100 can be used to form a water tight seal with the first port 1110.

In some embodiments, a second port 1120 can be formed in the housing 1100 proximate to the base 1500. The second port 1120 can be configured to drain the interior area 1150 of the filter tank 1000. A spout 1180 can be disposed with respect to the second port 1120 and can be threaded to threadingly engage a hose and/or other object, such as a cap. The spout 1180 can be closed by a valve or a cap 1190 to form a water tight seal so that when contents are disposed within the housing 1100, the contents do not escape through the second port 1120.

While the ports 1110 and 1120, have been illustrated at particularly locations on the housing 1100, and the inlet ports 3110 and 3120 have been illustrated as part of the cover assembly 3000, those skilled in the art will recognize one or more of the ports 1110, 1120, 3110, and 3120 can be disposed in other locations with respect to the housing. For example, one or more of the ports can be disposed, independently or otherwise, at one or more different locations, such as on a side of the housing.

Figure 3:
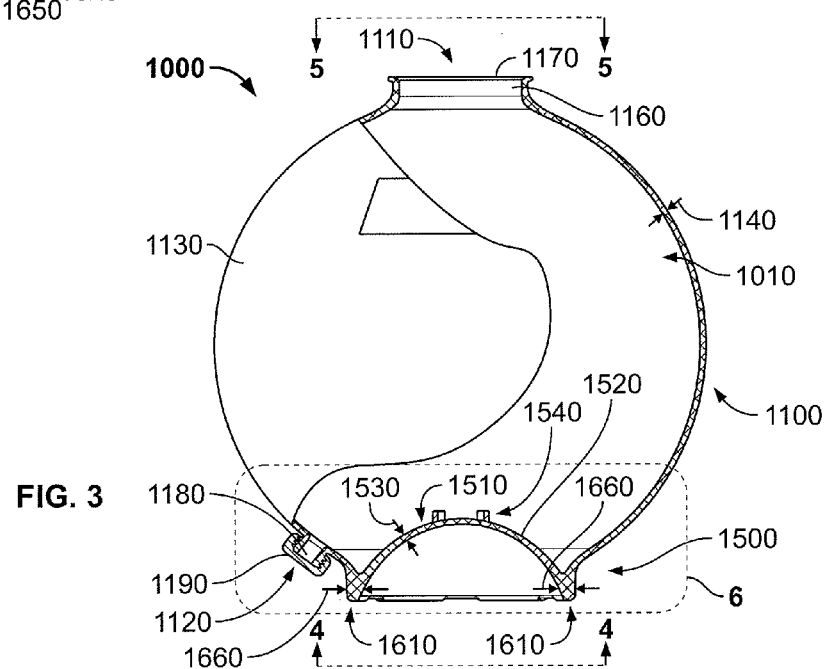
FIG. 3 is a partial cutaway view of the filter tank of FIG. 1.
Figure 4:
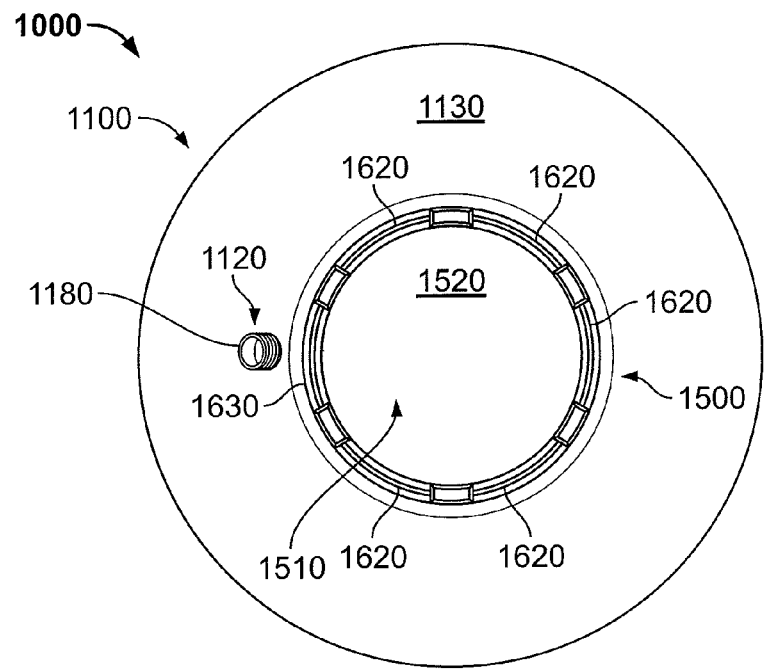
FIG. 4 is a bottom view of the filter tank along line 4-4 of FIG. 3.
Figure 5:
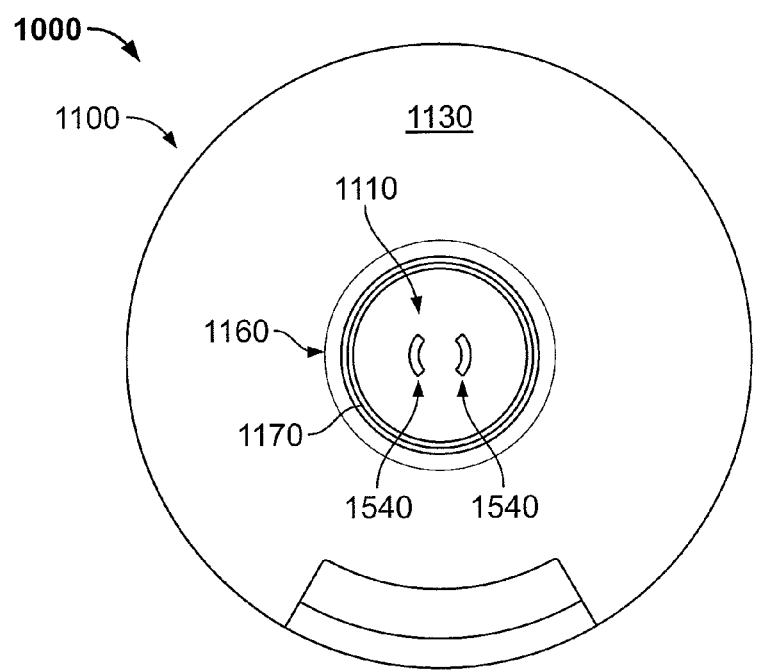
FIG. 5 is a top view of the filter tank along line 5-5 of FIG. 3.
Figure 6:
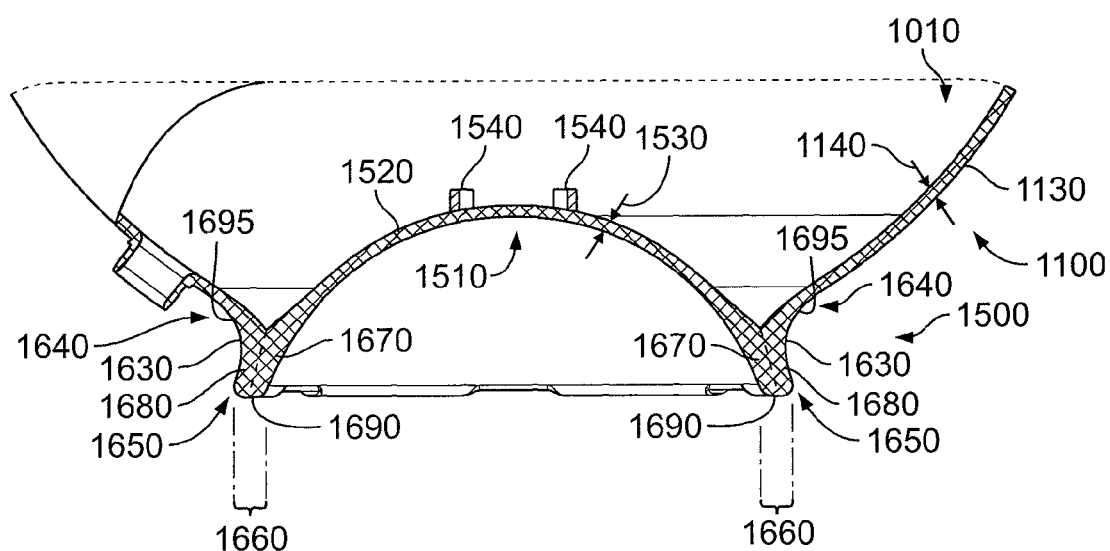
FIG. 6 is a detailed view of area 6 of FIG. 3.

Referring to FIGS. 1, 3, and 6, for example, the base 1500 can have a punted section 1510 protruding into the interior area 1150 of the filter tank 1000 and a filter tank support structure 1610 that can have a generally cylindrical ring configuration. The punted section 1510 of the base 1500 can form a bottom wall portion 1520 of the filter tank 1000. The bottom wall portion 1520 can protrude and/or extend into the housing 1100 and can form a convex interior wall in the interior area 1150 of the filter tank 1000 (or a concave exterior wall of the filter tank 1000) such that a cross-section of the punted section 1510 has a generally curved, dome, and/or parabolic shape. In some embodiments, a wall thickness 1530 of the punted section 1510 can be substantially equal to the wall thickness 1140 of the housing 1100. In some embodiments, the wall thickness 1530 of the punted section 1510 can be greater than the wall thickness 1140 of the housing 1100.

Underdrain mounting members 1540 can be disposed on an interior surface of the bottom wall portion 1520 to provide an area for mounting an underdrain within the filter tank 1000. The underdrain mounting members 1540 can have a complementary structure to filter tank mounting members of an underdrain so that the underdrain mounting members 1540 and the filter tank mounting members can be aligned to seat the underdrain on the bottom wall portion 1520. In some embodiments, the underdrain mounting members 1540 can be formed as grooves or channels on the bottom wall portion 1520. For example, the underdrain mounting members 1540 can be curved grooves configured to receive and/or capture the corresponding filter tank mounting members of the underdrain. In the present embodiment, a pair of underdrain mounting members 1540 can be positioned in an opposing relation so that opposing ends of the underdrain mounting members 1540 are aligned and the concave portions of the curved underdrain mounting members 1540 face each other.

The support structure 1610 of the base can integrally connect the punted section 1510 of the base 1500 to the housing 1100 and can provide a stable and reinforced stand for supporting the weight of the filter tank 1000 when the filter tank 1000 is loaded with a filtrate material (e.g., sand) and water. The support structure 1610 can include foot sections 1620 to provide points of contact between the filter tank 1000 and a surface upon which the filter tank 1000 is supported. An outer surface 1630 of the support structure 1610 can be contoured to flare outward at proximate and distal ends 1640 and 1650 of support structure 1610 such that an outer diameter of the base 1500 is greater at proximate and distal ends 1640 and 1650, respectively, than an outer diameter of the support structure 1610 between the proximate and distal ends 1640 and 1650.

The support structure 1610 can be formed by pinching, pressing, and/or folding layers of a molten polymer together during a manufacturing process of the filter tank 1000. For example, a mold used to form the filter tank 1000 can be configured to fold and/or pinch layers of molten polymer together about an outward bend 1690 to form a support structure with reinforced walls to securely support the load applied by the filter tank when the filter tank 1000 is filled with the filtrate material (e.g., sand) and water. As one example, at least two layers of molten polymer can be used to form the support structure 1610. In some embodiments, the support structure 1610 can have a thickness 1660 that is at least about 25 to about 300 percent thicker than the wall 1130 of the housing 1100 or about 75 percent to about 150 percent thicker than the wall 1130 of the housing 1100.

In some embodiments, the support structure 1610 can have a thickness 1660 that is about twice the wall thickness 1140 of the wall 1130, such that the support structure 1610 forms a "double wall". For example, as shown in FIGS. 1, 3, and 6, the support structure 1610 can be formed by a first polymer layer 1670 extending between the outward bend 1690 and an inward bend 1695 and a second polymer layer 1680 on the other side of the outward bend 1690. The first and second polymer layers 1670 and 1680 can be pinched or folded together during the filter tank manufacturing process. While FIGS. 1, 3, and 6 are illustrative of a double wall, those skilled in the art will recognize, that additional layers of polymer can be folded and/or pinched together to form a thicker support structure.

In some embodiments, the thickness 1660 of the support structure 1610 can be specified to support a total weight of the filter tank after the filtrate material and water have been added. By using folded layers of polymer, the support structure 1610 is strengthened and reinforced to bare the load applied by the filter tank 1000 in operation and provides a stable base for the filter tank 1000. Forming the filter tank as a unitary structure having an integrally formed housing and reinforced base provides a cost effective, stable, and durable filter tank for filtration of pool water.

In exemplary embodiments, the filter unit 100 can be a "sand filter" unit for filtering water from a pool, spa, hot tub, aqua-culture environment, fountain, or the like, using sand as a filtrate material. In such embodiments, the sand disposed within the housing 1100 of the filter tank 1000 can result in a large load to be supported by the integral base 1500 of the filter tank 1000. For example, a typical load from the sand can be in the range of about forty (40) to about three hundred fifty (350) pounds. In conventional sand filter designs, the base and filter tank are typically separately constructed. By allowing the base to be fabricated separately from the housing, the different processes, materials, structures, and the like can be used to construct a base with sufficient strength to support the load of the sand. However, requiring separate fabrication of the housing and the base results in a manufacturing process that can be less than optimal. In exemplary embodiments the housing and base are concurrently and integrally formed using the same material and the same fabrication process so that the base and the housing form an integral unitary filter tank 1000. To support the load of the sand exemplary embodiments form the section using layers of polymer in the base that are folded, pressed, and/or pinched together during the manufacturing process of the unitary filter tank 100.

FIGS. 7-12 show an exemplary filter tank manufacturing system 4000 and process for forming a unitary filter tank having an integrally formed housing and base. For example, embodiments of the manufacturing system 4000 and process can be implemented to form embodiments of the filter tank 1000 (FIGS. 1-6). The system 4000 can include an extrusion head 4100, a mold 4200 operatively coupled to presses 4500 and 4600, and a blow pin 4700. The extrusion head 4100 can extrude molten polymer parison 4110 to be shaped using the mold 4200 and the blow pin 4700. In some embodiments, the molten polymer parison 4110 can be extruded from the extrusion head 4100 in a generally cylindrical shape.

The mold 4200 can be partitioned into housing formation area 4210 including housing formation molders 4220 and 4230 and base formation area 4240 including base formation molders 4250 and 4260. The housing formation area 4210 facilitates formation of the housing portion of the filter tank and the base formation area 4240 facilitate formation of the base portion of the filter tank. The housing formation molders 4220 and 4230 can include contoured surfaces 4222 and 4232, respectively, corresponding to an exterior surface of the housing to be formed using the mold 4200. For example, in some embodiments, the contoured surfaces 4222 and 4232 can be generally semispherical such that when the mold 4200 is closed, the molders 4220 and 4230 are brought together and the contoured surfaces 4222 and 4232 form a generally spherical cavity. In exemplary embodiments, the molders 4220 and 4230 can be configured to form the port 1110 of the housing 1000. For example, the molders 4220 and 4230 can include contoured or notched surfaces 4226 and 4236 for forming the collar 1160 and interface portions 1170 of the housing 1000 (e.g., FIGS. 1-3 and 5).

In the present embodiment, transition points 4270 and 4280 separate the housing formation area 4210 from the base formation area 4240. The transition points 4270 and 4280 can form triangular tooth-like segments protruding inwardly into the mold cavity 4300. The transition points 4270 and 4280 can operate to form a transition area between the housing and base of the filter tank to be formed using the mold 4200. Furthermore, the transition points 4270 and 4280 can operate to form the inward bend 1695 in the molten polymer during filter tank formation to facilitate folding, pressing, and/or pinching of the molten polymer in the base formation area to form the support structure 1610 of the base 1500.

The housing formation molders 4220 and 4230 and the base formation molders 4250 and 4260 can be moveable along the x-axis 4202 by the press 4500 to close the mold 4200 and form a mold cavity 4300. For example, the press 4500 can be configured to urge opposing molders towards each other as indicated by arrows 4510 (FIG. 8) to close the mold. When the mold 4200 is closed (e.g., FIGS. 9-11), the housing formation molders 4220 and 4230 of the mold 4200 abut at a distal end 4320 of the mold 4200 and the base formation molders 4250 and 4260 of the mold 4200 abut at a proximate end 4330 of the mold 4200. Closing the mold 4200 on a molten polymer parison 4110 extrusion extending between and beyond the proximate and distal ends 4330 and 4320 of the mold 4200 pinches the molten polymer parison 4110 together at the proximate and distal ends 4330 and 4320 of the mold 4200 to form a molten polymer body 4340 to be shaped to conform to the contoured surfaces of the molders.

Figure 8:
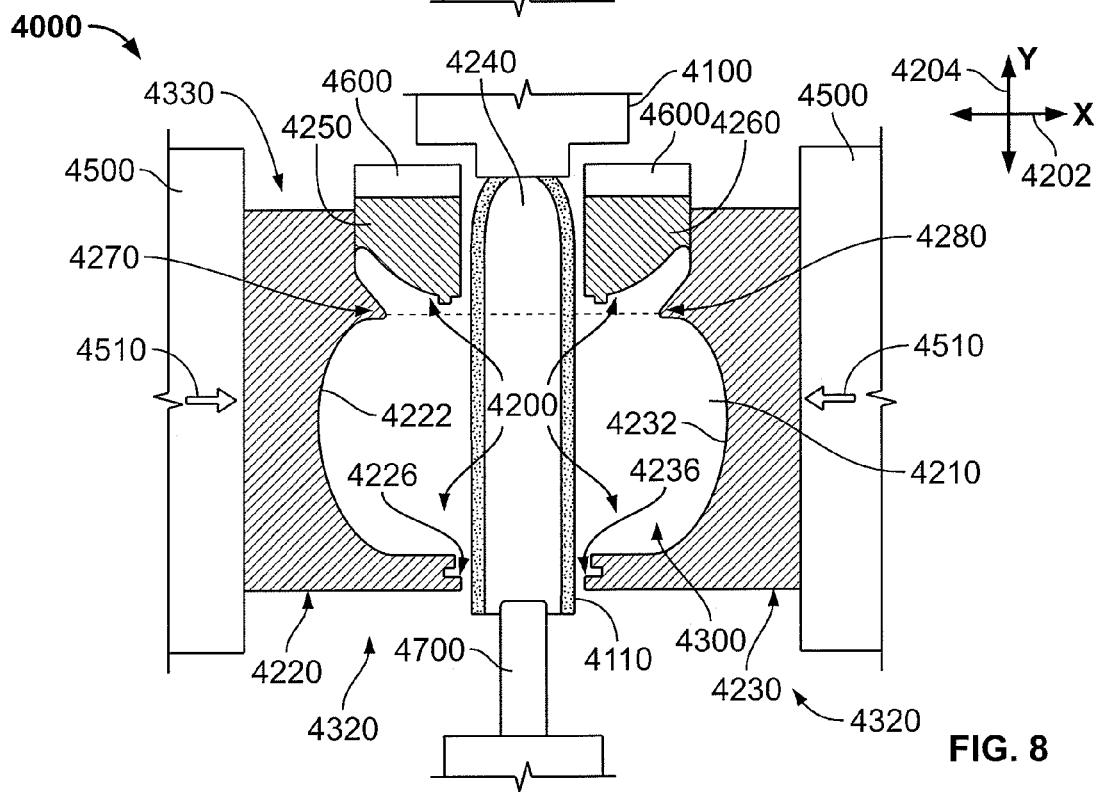
Figure 9:
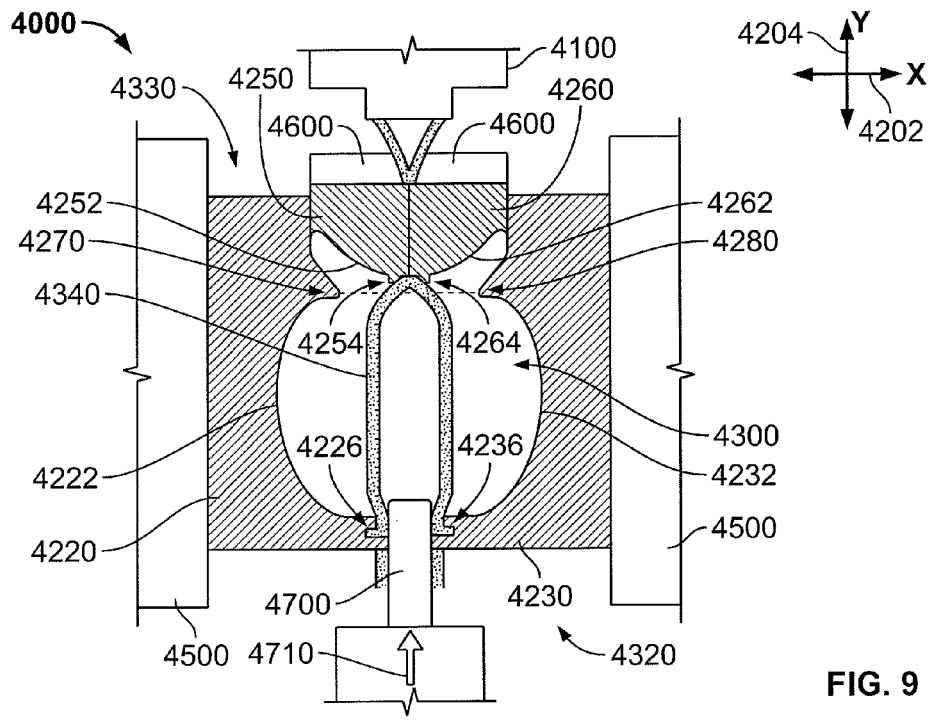
Figure 10:
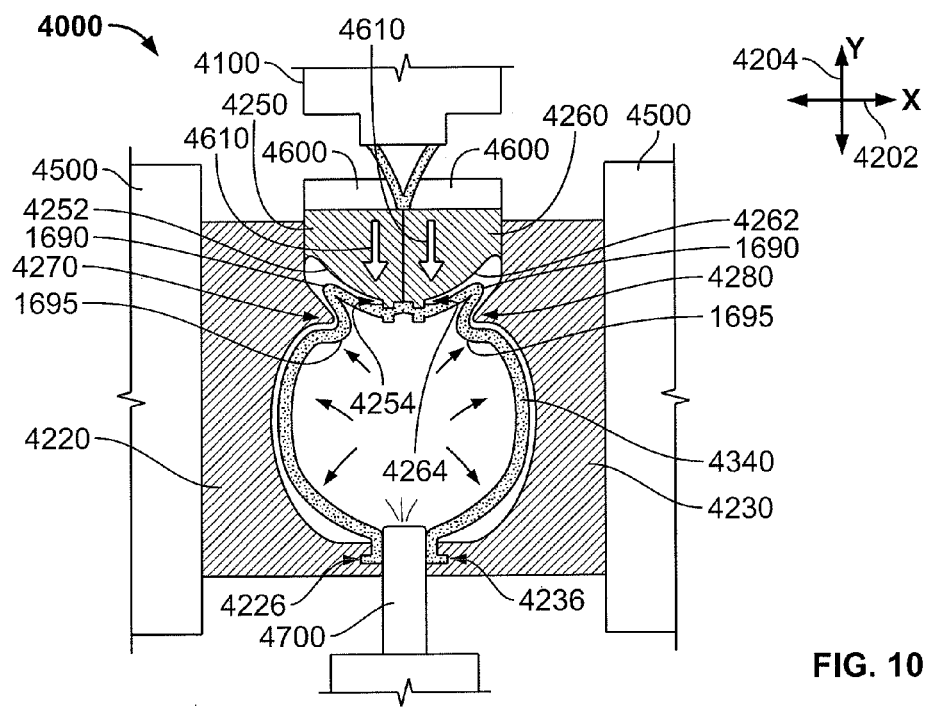

The base formation molders 4250 and 4260 can include contoured surfaces 4252 and 4262 corresponding to the punted section 1510 and the support structure 1610 of the base 1500 (FIG. 1). For example, each of the molders 4250 and 4260 can include a generally curved, arc-like surface such that when the molders 4250 and 4260 are pressed together along the x-axis 4202 by the press 4500, the molders 4250 and 4260 form a convex surface extending into the mold cavity 4300, where a cross-section of the convex surface is curved and/or parabolic, as shown in FIGS. 8-10. The contoured surfaces 4252 and 4262 can also include contoured or protruding portions 4254 and 4264, respectively, for forming the underdrain mounting members 1540. While contoured portions 4254 and 4264 have been illustrated as protruding from the contoured surfaces 4252 and 4262, respectively, those skilled in the art will recognize that the contoured surfaces 4254 and 4264 can be recessed in the contoured surfaces 4252 and 4262, respectively. Thus, in exemplary embodiments, the underdrain mounting members 1540 can be raised, recessed, or otherwise formed in or on the punted section. The base formation molders 4250 and 4260 can be moveable along the x-axis 4202 by the press 4500 to close the mold 4200 and form the mold cavity 4300. Additionally, the base formation molders 4250 and 4260 can be moveable by the press 4600 along a y-axis 4204 to urge the molders 4250 and 4260 towards or away from the transition points 4270 and 4280, respectively.

Figure 11:
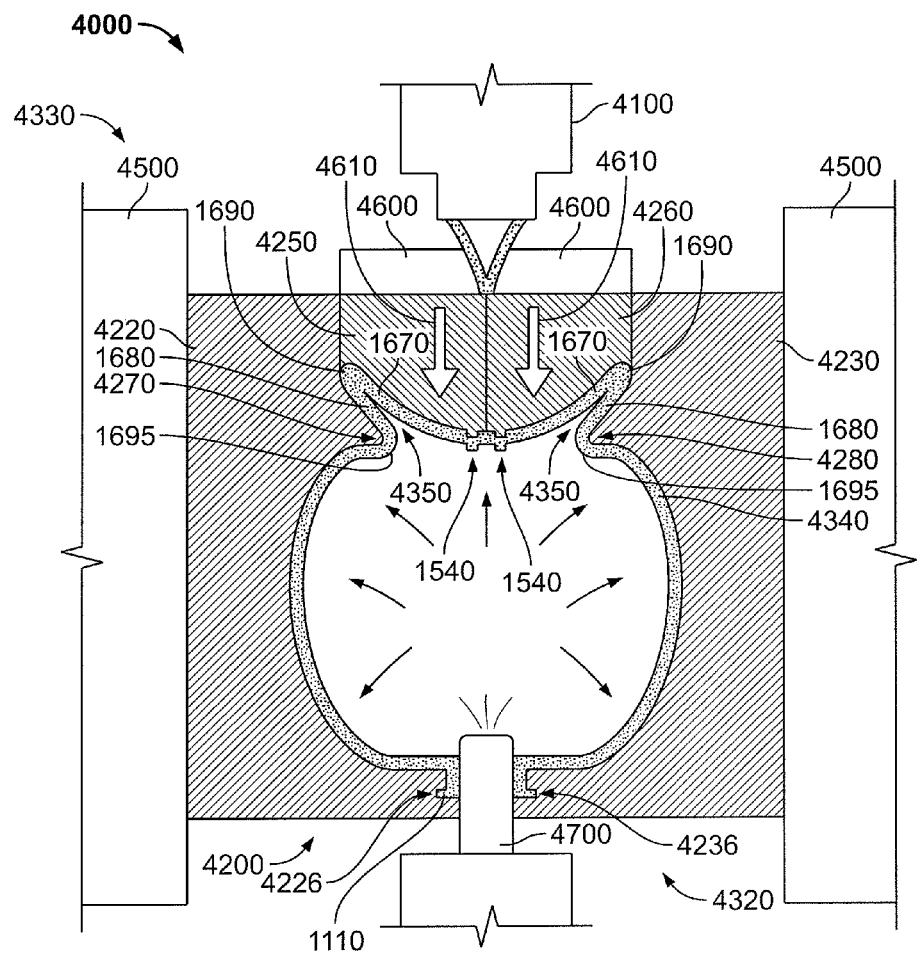
Figure 12:
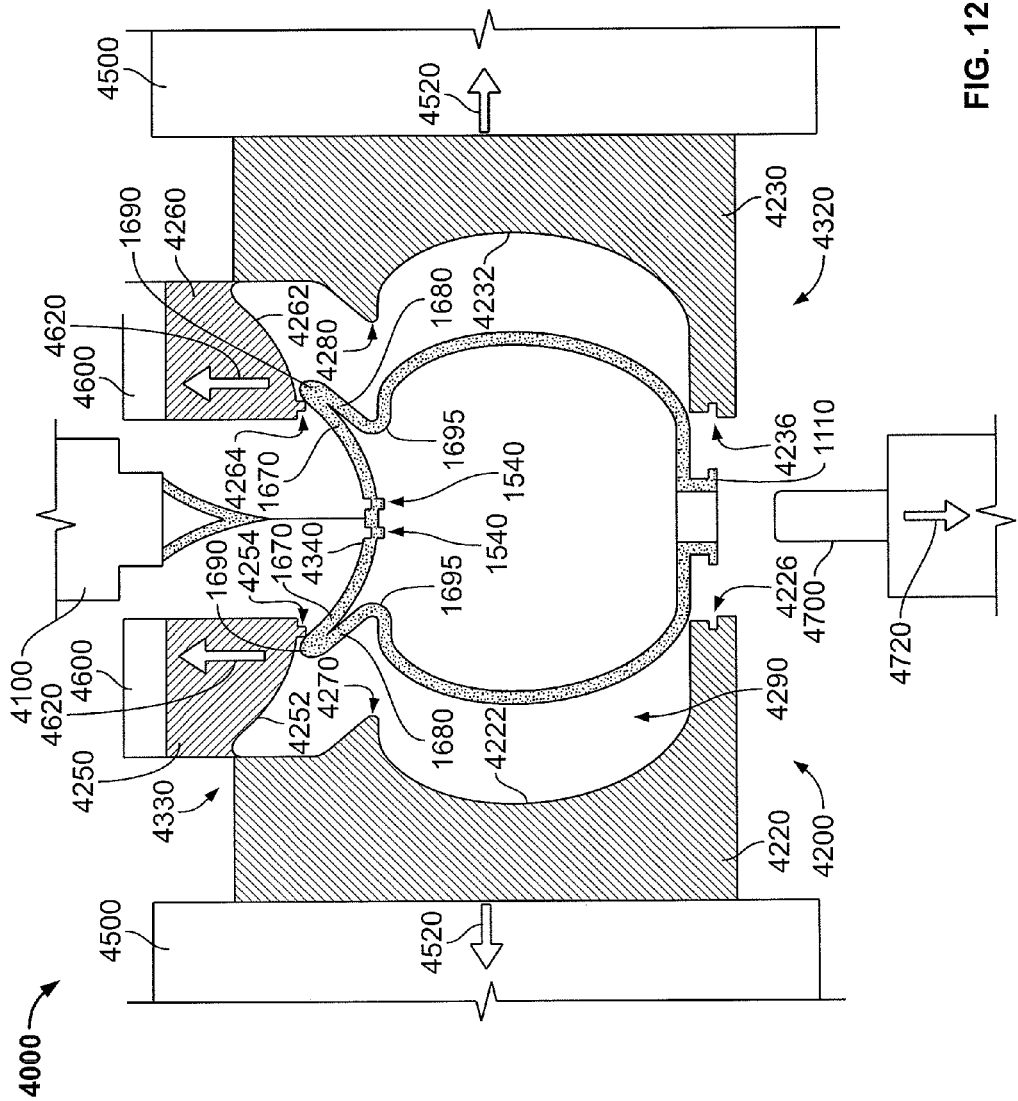
Figure 1:
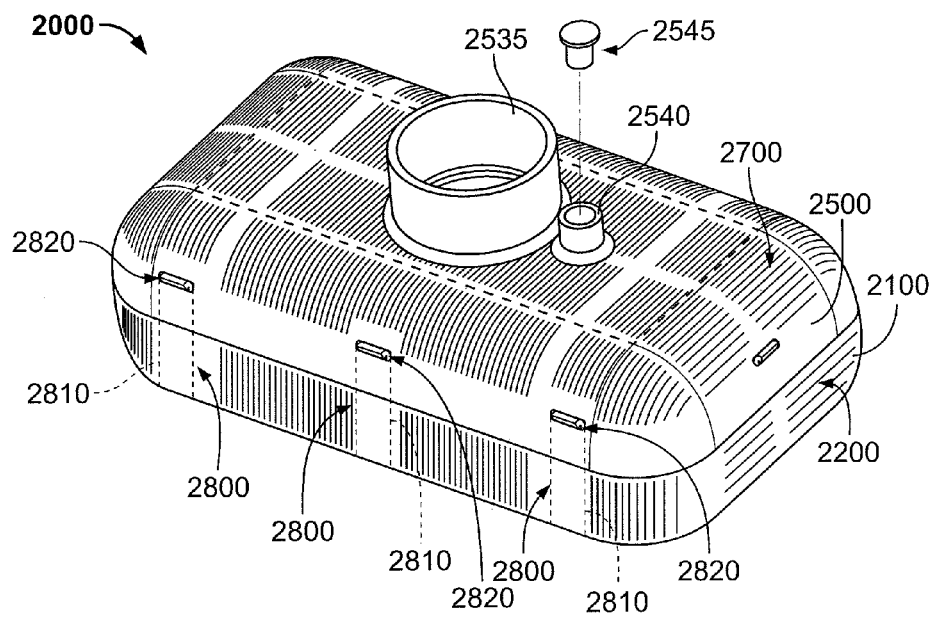

Referring to FIGS. 10 and 11, for example, the blow pin 4700 can force air into a molten polymer body 4340 formed upon closing the mold 4200 on extruded molten polymer parison 4110. The forced air can urge the molten polymer body 4340 to conform to the contoured surfaces of the mold 4200. The blow pin 4700 can also introduce air to cool and harden the molten polymer body 4340. The blow pin 4700 is generally moveable along the y-axis 4204 to move a distal end 4710 of the blow pin 4700 into and out of the mold area 4290 and/or the mold cavity 4300.

Figure 7:
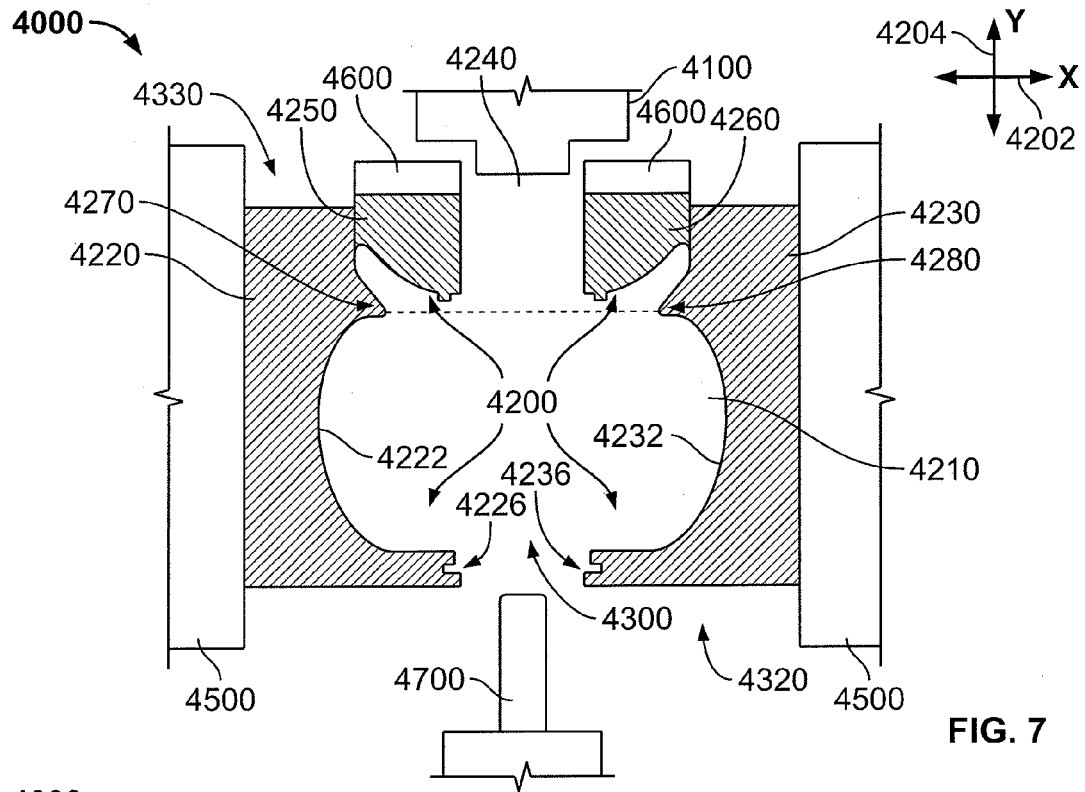
FIGS. 7-12 show an exemplary system and process for forming the filter tank in FIG. 1.

Referring to FIGS. 7-12, an exemplary embodiment of the filter tank manufacturing process can begin with the mold 4200 in an open position. In the open position, as shown in FIGS. 7 and 8, the molders 4220 and 4230 are separated and the molders 4250 and 4260 are separated. Additionally, the molders 4250 and 4260 are raised away from the transition points 4270 and 4280, respectively. A polymer resin, such as a high density polyethylene, can be heated to form the molten polymer parison 4110 extruded by the extrusion head 4100. The extrusion head 4100 extrudes the molten polymer parison 4110 into the mold area 4290 so that the molten polymer parison 4110 extends between and beyond proximate and distal ends 4330 and 4320 of the mold 4200. Once a sufficient amount of molten polymer parison 4110 has been extruded, the press 4500 can urge opposing molders of the mold 4200 along the x-axis 4202, as shown by arrows 4510 (FIG. 8), so that the mold 4200 closes and the molten polymer parison 4110 is pinched at the proximate and distal ends 4330 and 4320 of the mold 4200 to create the molten polymer body 4340 within the mold cavity 4300, as shown in FIG. 9.

Before, during, or after closing the mold 4200, the blow pin 4700 can be introduced into the mold cavity 4300, as indicated by arrow 4710 in FIG. 9. The blow pin 4700 can extend into an interior area of the molten polymer body 4340. In the mold closed position, as shown in FIGS. 10 and 11, for example, the blow pin 4700 can blow or force air into the molten polymer body 4340 expanding the molten polymer body 4340 to urge or force the molten polymer outward towards the contoured surfaces of the mold 4200. As the molten polymer body 4340 expands, the molten polymer body 4340 presses against the contoured surfaces 4222 and 4232 to form the housing, and presses against the contoured surfaces 4226 and 4236 to form the first port 1110. As the molten polymer body 4340 expands, the molten polymer body 4340 also presses against the transition points 4270 and 4280 so that the transition points 4270 and 4280 have a bottleneck like effect on the body 4340 to bend the molten polymer body 4340 inward about the transition points 4270 and 4280 to create the inward bend 1695 in a portion of the molten polymer body 4340. As the molten polymer body 4340 continues to expand, the molten polymer body 4340 is urged against the base formation molders 4250 and 4260 to form the outward bend 1690 in the molten polymer body 4340 between the base formation molders 4250 and 4260 and the transition points 4270 and 4280. The first layer 1670 is defined between the inward bend 1695 and the outward bend 1690 and the second layer 1680 is formed by the outward bend 1690.

Referring to FIGS. 10 and 11, once the body 4340 is expanded so that the inward bend 1695 and outward bend 1690 are formed in the molten polymer body 4340, the base formation molders 4250 and 4260 can be lowered by the press 4600 along the y-axis 4204, as indicated by arrows 4610, towards the transition points 4270 and 4280 to press the second polymer layer 1680 against the first polymer layer 1670. As the base formation molders 4250 and 4260 push the molten polymer in the base formation area 4240 towards the transition points 4270 and 4280, respectively, the base formations molders 4250 and 4260 can fold, press, and/or pinch the first and second layers 1670 and 1680 between the base formation molders 4250 and 4260 and the transition points 4270 and 4280, respectively, and can form the convex inner surface of the punted section 1510 as well as the underdrain mounting members 1540. Once the base formation molders 4250 and 4260 have been fully lowered the second polymer layer 1680 is folded upon the first polymer layer 1670 and/or pinched between the base formation molders 4250 and 4260 and the transition points 4270 and 4280 to form the support structure 1610 of the base 1500 and the curved surfaces of the base formation molders between the transition points form the convex punted section 1510.

The blow pin 4700 can continue to blow air to cool and harden the molten polymer. Once the molten plastic has been sufficiently cooled and hardened, the press raises the base formation molders 4250 and 4260 along the y-axis 4204 away from the transition points 4270 and 4280, as indicated by arrows 4620, opens the mold 4200 by moving the opposing molders of the mold 4200 away from each other, as indicated by arrows 4520, and lowers the blow pin 4700, as indicated by 4720, to release the newly formed filter tank.

Referring to FIGS. 1 and 13-22, an exemplary embodiment of the underdrain 2000 can be formed using two selectively interlocking components 2100 and 2500. The underdrain 2000 can be inserted into a filter tank at or near the bottom of the filter tank and can operate to permit water from within the filter tank to enter the underdrain, but prevent filtrate material, such as sand, from entering the underdrain 2000. In the present embodiment, the component 2100 can form a bottom of the underdrain 2000 and the component 2500 can form a top of the underdrain 2000. The components 2100 and 2500 can be selectively coupled by inter-component locking structures 2800. The component 2100 can include a first locking member 2810 of the inter-component locking structure 2800 and the component 2500 can include a second locking member 2820 of the inter-component locking structure 2800. The first and second locking members 2810 and 2820 can be configured to interlock the component 2100 to the component 2500 to form the underdrain 2000.

In exemplary embodiments, the components 2100 and 2500 can be preassembled to form the underdrain 2000 before being disposed within a filter tank such that the assembled underdrain 2000 can have dimension figured to pass through an opening in the filter tank. For example, the underdrain 2000 can have a width, height, and/or length that is narrower than a width or diameter of an opening (e.g., first port 1110) in the filter tank (e.g., filter tank 1000). In the present example, the underdrain 2000 can pass through the opening without adjusting, manipulating, reconfiguring, or the like, a structure of the assembled underdrain 2000.

In exemplary embodiments, at least one dimension of the underdrain 2000 is greater than a width or diameter of the opening in the filter tank through which the underdrain 2000 passes to dispose the underdrain within the filter tank. For example a length of the assembled underdrain 2000 can be greater than the diameter of the opening in the filter tank through which the underdrain 2000 passes to dispose the underdrain within the filter tank such that once the assembled underdrain 2000 is oriented for operation within the filter tank, the dimensions of the underdrain prevent removal of the underdrain from the filter tank. The configuration and dimensions of the underdrain 2000, for example having at least one dimension that is greater than the opening through which the underdrain 2000 passes to be disposed within the filter tank, can facilitate uniform operation of a sand filter unit to reduce and/or prevent channeling in the sand and/or to facilitate uniform distribution of water during a backwash operation.

Figure 14:
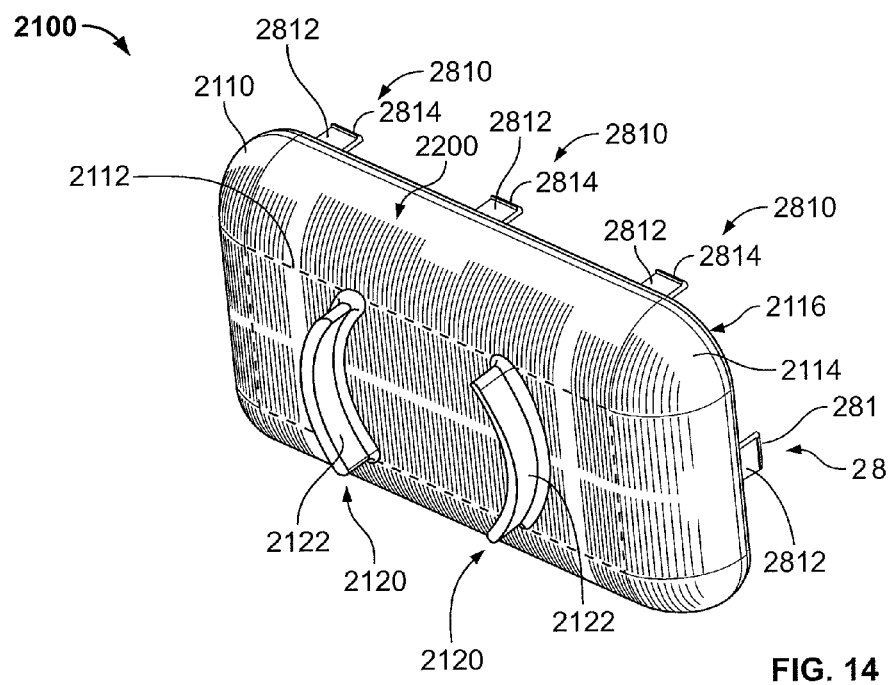
FIG. 14 is a perspective view of the bottom component of the underdrain of FIG. 13.
Figure 15:
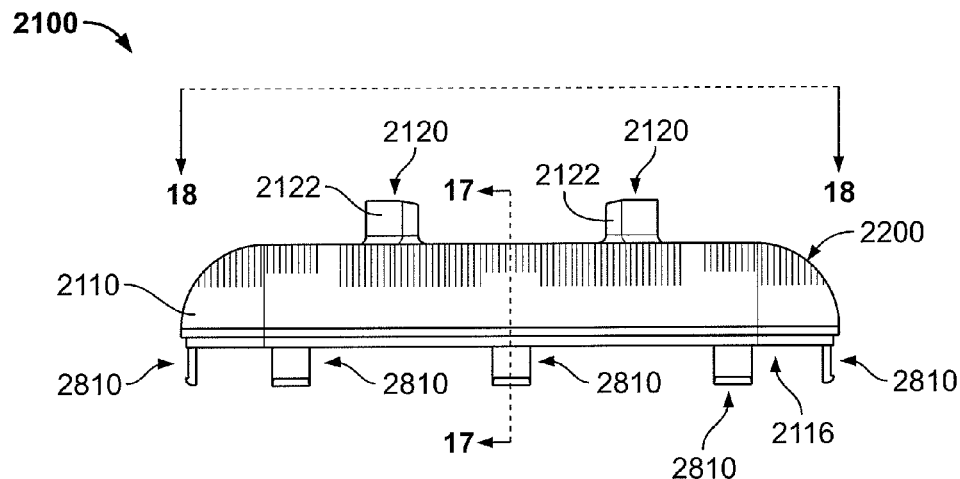
FIG. 15 is a side view of the bottom component of the underdrain of FIG. 14.
Figure 16:
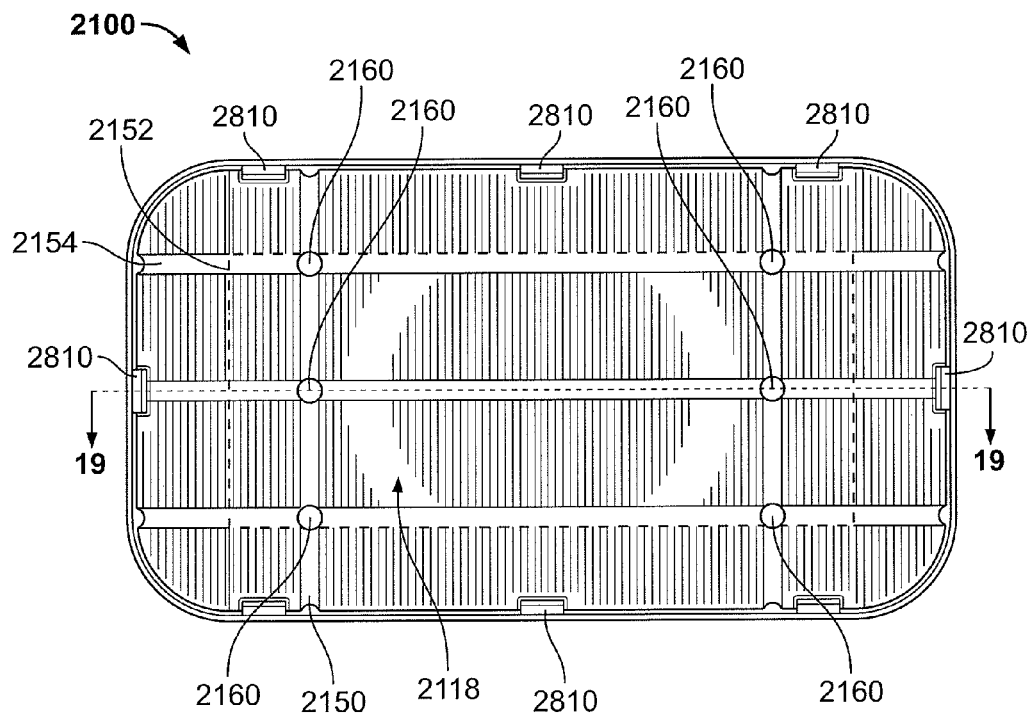
FIG. 16 is a bottom view of the bottom component of the underdrain of FIG. 14.

Referring to FIGS. 13-22, the bottom component 2100 can have an outer surface 2110, an inner surface 2150, the first locking members 2810, bracing members 2160, and drainage openings 2200, such as slits, slots, apertures, holes, channels, and the like. As shown in FIG. 14, for example, the outer surface 2110 can include a generally flat or planar section 2112 and generally curved side section 2114 extending to a tiered edge 2116 forming an inner and outer perimeter of the bottom component 2100 and defining an interior area 2118 of the bottom component 2100. Filter tank mounting members 2120 can be disposed on the planar section 2112 of the outer surface 2110 to facilitate mounting of the underdrain 2000 on a bottom inside of a filter tank, which can have corresponding underdrain mounting members, such as underdrain mounting members 1540. The filter tank mounting members 2120 can include raised portions 2122 extending away from the planar section 2112. The raised portions 2122 can be curved along the outer surface 2110 and can be configured to interface with the corresponding underdrain mounting members 1540 of the filter tank 1000. The raised portions 2122 can have an opposing relation such that concave portions of the raised portions 2122 face each other.

Referring to FIGS. 17 and 19-21, for example, the tiered edge 2116 can include a first section 2124 that is generally parallel to the planar section 2112 of the outer surface 2110, a second section 2126 that is generally perpendicular to and extends from and inner end 2128 of the first section 2124 and, and a third section 2132 extending generally perpendicularly from the second section 2126 and generally parallel to the first section 2124. The first section 2124 of the tiered edge 2116 can have a width 2134 forming a lip about an outer perimeter of the tiered edge 2116 upon which a portion of an edge of the top component 2500 can rest when the components 2100 and 2500 are interlocked. The second and third sections 2126 and 2132 of the tiered edge 2116 can extend into an interior area of the component 2500 when the components 2100 and 2500 are interlocked. The second section 2126 can form a guide for receiving and aligning the components 2100 and 2500 to facilitate interlocking of the components 2100 and 2500, and can provide a barrier with the edge of the top component to prevent filtrate material from entering the underdrain between the edges of the components 2100 and 2500. The third section 2132 can have a width 2138 forming a lip about an inner perimeter of the tiered edge 2116.

As shown in FIGS. 16-20, for example, the inner surface 2150 of the component 2100 generally conforms to the outer surface 2110 such that the planar section 2112 and curved side section 2114 are reflected generally as a planar section 2152 and a curved side section 2154 on the inner surface 2150. The bracing members 2160 can extend from the inner surface 2150 into the interior area 2118 of the component 2100, and in some embodiments, can extend to be substantially flush with the third section 2132 of the tiered edge 2116 so that a tip 2162 of the bracing members 2130 extends into the top component 2500 when the components 2100 and 2500 are interlocked. The bracing members 2160 can have a generally elongate cylindrical or rod-like body and can extend generally perpendicularly from the planar section of the inner surface 2150. The bracing members 2160 can include a recess 2164 at the tip 2162 that corresponds to a length 2166 of the second section 2126 of the tiered edge 2116 such that a bottom of the recess 2164 is substantially flush with the first section 2124 of the tiered edge 2116. The tip 2162 of the bracing members 2160 can be configured to receive a tip of the bracing members of the top component 2500 such that a distal end of the tip of the bracing members of the component 2500 abut the bottom of the recesses in the tips 2162 of the bracing members 2160.

Figure 17:
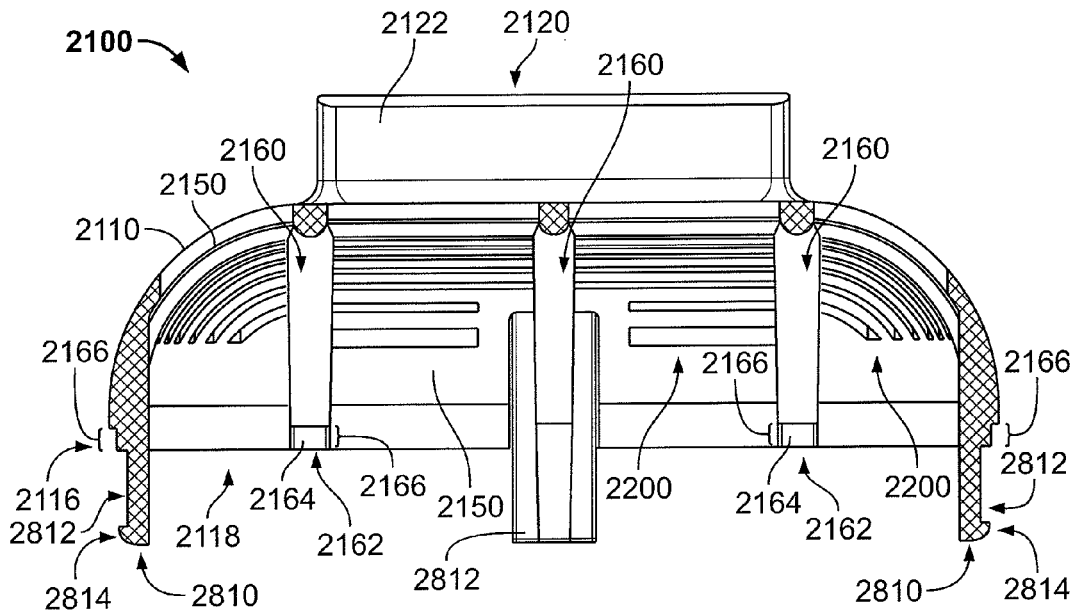
FIG. 17 is a cross-sectional view of the bottom component of the underdrain along the line 17-17 of FIG. 15.
Figure 18:
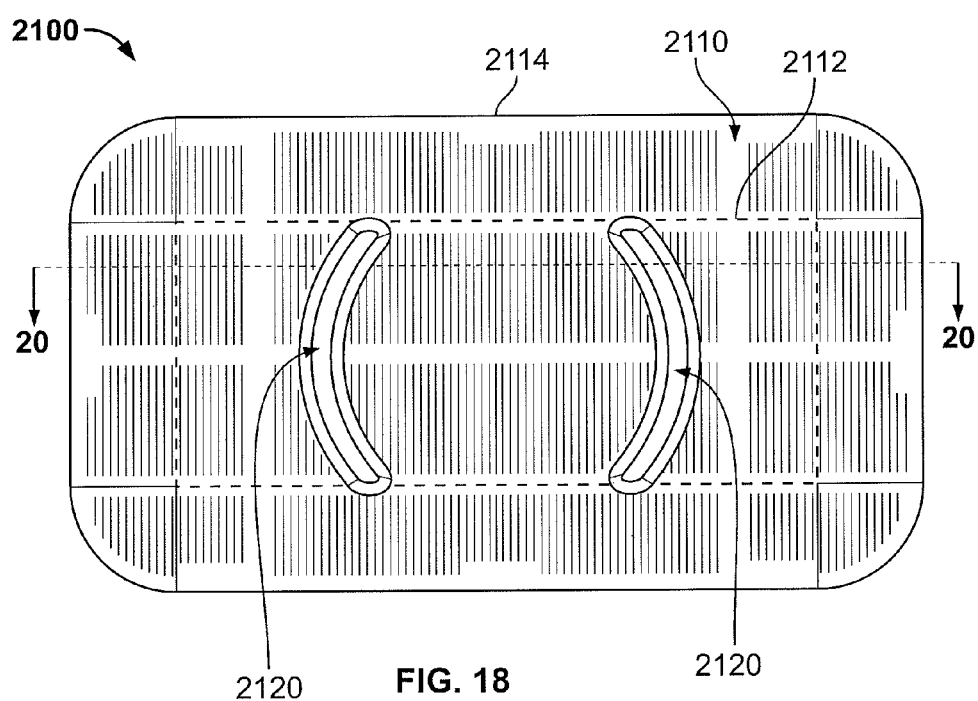
FIG. 18 is a top view of the bottom component along line 18-18 of FIG. 15.
Figure 19:
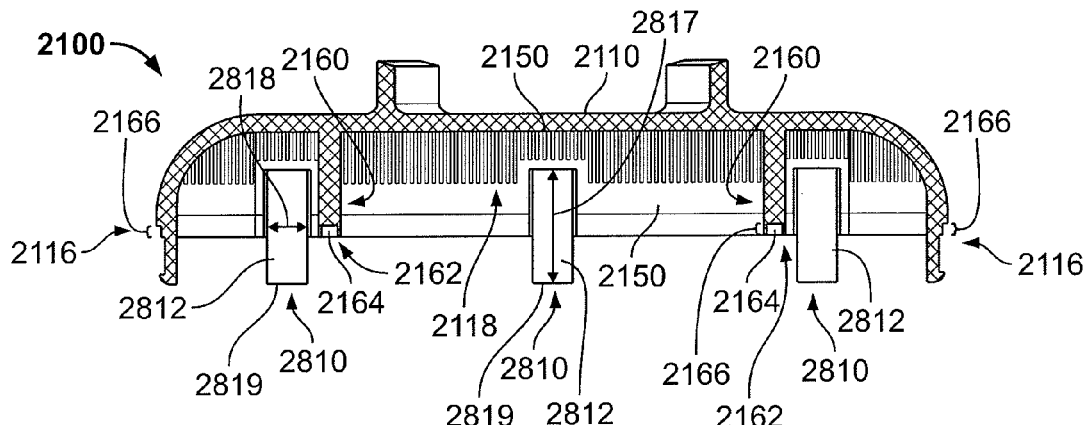
FIG. 19 is a cross-sectional view of the bottom component of the underdrain along the line 19-19 of FIG. 16.
Figure 20:
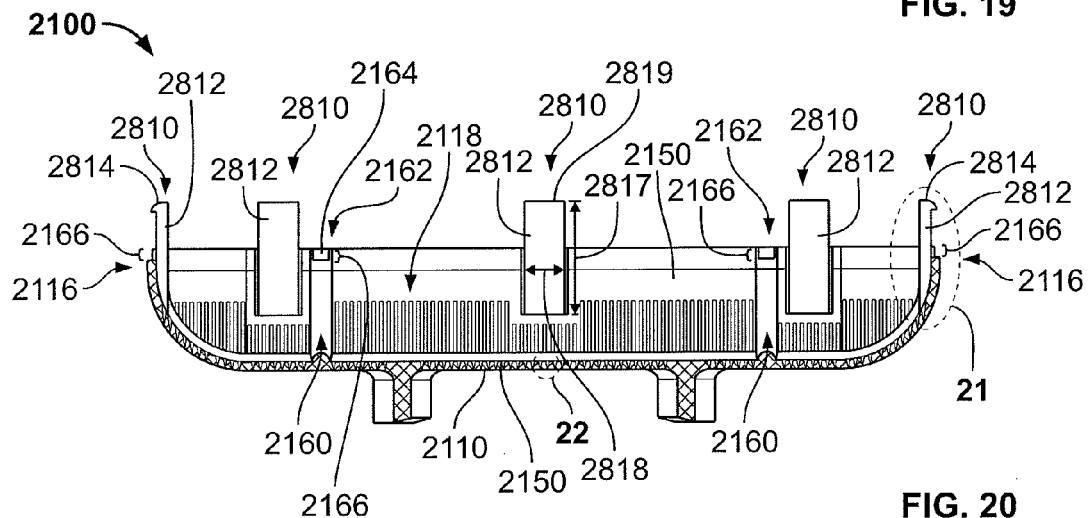
FIG. 20 is a cross-sectional view of the bottom component of the underdrain along the line 20-20 of FIG. 18.
Figure 21:
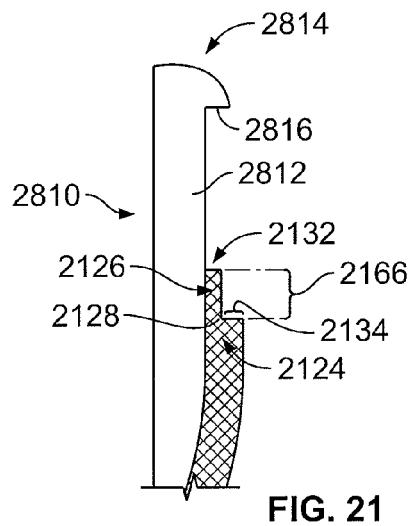
FIG. 21 is a detailed view of area 21 in FIG. 20.

Still referring to FIGS. 13-22, and more particularly to FIGS. 14, 17, and 21, for example, the first locking members 2810 can be distributed about, inward of, and proximate to a perimeter of the tiered edge 2116. The first locking members 2810 can be projections, each having a generally rectangular body section 2812 with a length 2817 and a width 2818, and a retaining section 2814 extending from a distal end 2819 of the rectangular body 2812. The rectangular body sections 2812 of the first locking members 2810 can be substantially perpendicular to the second section 2126 of the tiered edge 2116, and therefore, substantially perpendicular to the planar sections 2112 and 2152. The rectangular body section 2812 can extend outward from the interior area 2118 to extend beyond the tiered edge 2116. The retaining section 2814 of the first locking members 2810 can protrude from the body section 2812 to provide a lip 2816. The first locking members 2810 can be resilient members that can be urged and/or deflected inwardly with respect to the perimeter of the tiered edge 2116 and subsequently can return or spring back to their nominal position.

Figure 22:
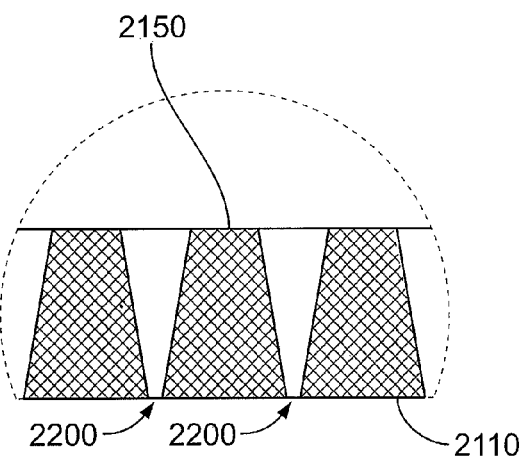
FIG. 22 is a detailed view of area 22 in FIG. 20.
Figure 23:
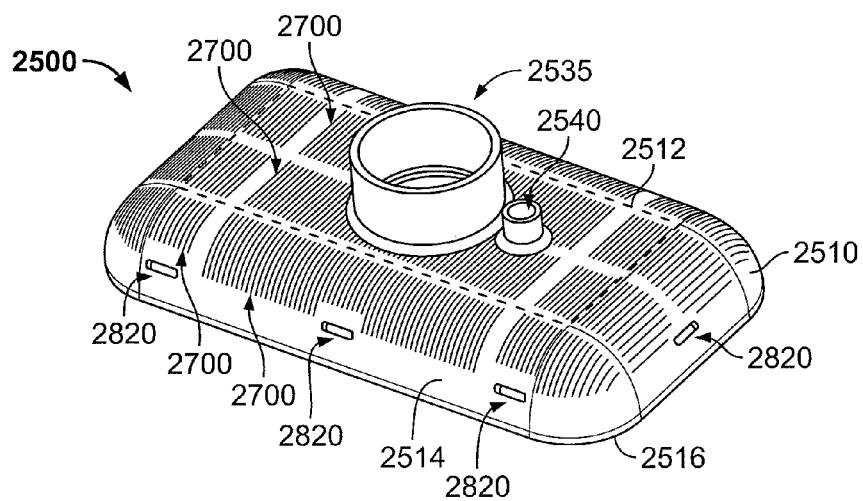
FIG. 23 is a perspective view of the top component of the underdrain of FIG. 13.

The drainage openings 2200 can be formed during the molding of the bottom component and can be dimensioned to permit water to pass through, but to prevent filtrate material from passing through. The drainage openings 2200 can be distributed about the outer surface 2110 of the bottom component 2100 and extend through a wall of the bottom component 2100 defined by the outer and inner surfaces 2110 and 2150 to facilitate communication between an interior and the exterior of the underdrain 2000. As shown in FIG. 22, the drainage openings 2200 can be tapered such that the drainage openings 2200 can start with a narrow outer opening 2210 in the outer surface 2110 of the bottom component 2100 can gradually widen towards an inner surface 2150 of the bottom component 2100. The drainage openings 2200 can be wider at the inner surface 2150 than at the outer surface 2110 to encourage water to more freely flow into the underdrain 2000 after passing through the outer surface 2110. The dimensions of the drainage openings 2200 at the outer surface 2110 can permit water to there through, but to prevent filtrate material from passing there through, while the dimensions of the drainage openings 2200 at the inner surface can be sized without regard to the dimensions of the filtrate material.

Referring to FIGS. 1, 13, and 23-31, the top component 2500 of the underdrain can have an outer surface 2510, the first port 2535, and the second port 2540, an inner surface 2550, bracing members 2560, drainage openings 2700, and the second locking members 2820. The outer surface 2510 can include a generally flat or planar section 2512 and generally curved side section 2514 extending to a tiered edge 2516 forming a inner and outer perimeter of the top component 2500 and defining an interior area 2518 of the component 2500. The first port 2535 can be disposed on the planar section 2512 of the outer surface 2510 and can form an opening in the component 2500 to facilitate communication between an interior and exterior of the underdrain 2000. The first port 2535 can have a cylindrical configuration and can be configured to receive a conduit (e.g., a pipe or tube), such as the recirculation pipe 3300 for transporting water from the underdrain 2000 to a body of water, such as a pool, and/or to permit a backwash operation. In some embodiments, the first port 2535 can be centered with respect to the sides of the component 2500. The second port 2540 can be disposed on the planar section 2512 of the outer surface 2510 and can form an opening in the top component 2500 to facilitate communication between an interior and exterior of the underdrain 2000. In an exemplary embodiment, the second port 2540 can have a cylindrical configuration and can be configured as a venting port to receive a venting conduit (e.g., a pipe or tube) for venting of the interior area of the underdrain 2000 to the atmosphere. For embodiments in which venting is not employed, a pin 2545 (FIG. 13) can be inserted into the port 2540 to close the port and prevent filtrate material (e.g., sand) from entering the interior area of the underdrain 2000 via the second port 2540. For example, while FIG. 1 includes a venting conduit extending from the port 2540, those skilled in the art will recognize that venting can be accomplished through the port 2535 in the illustrated configuration. Furthermore, for embodiments in which the inlet and outlet ports are on the side of the housing of the filter tank, venting can be accomplished using the port 2540 and the venting conduit In some embodiments, the second port 2540 can be proximate to the first port 2535 and can have a diameter that is smaller than a diameter of the first port 2535. In some embodiments, the second port 2540 can be offset from a center point with respect the sides of the component 2500.

Figure 28:
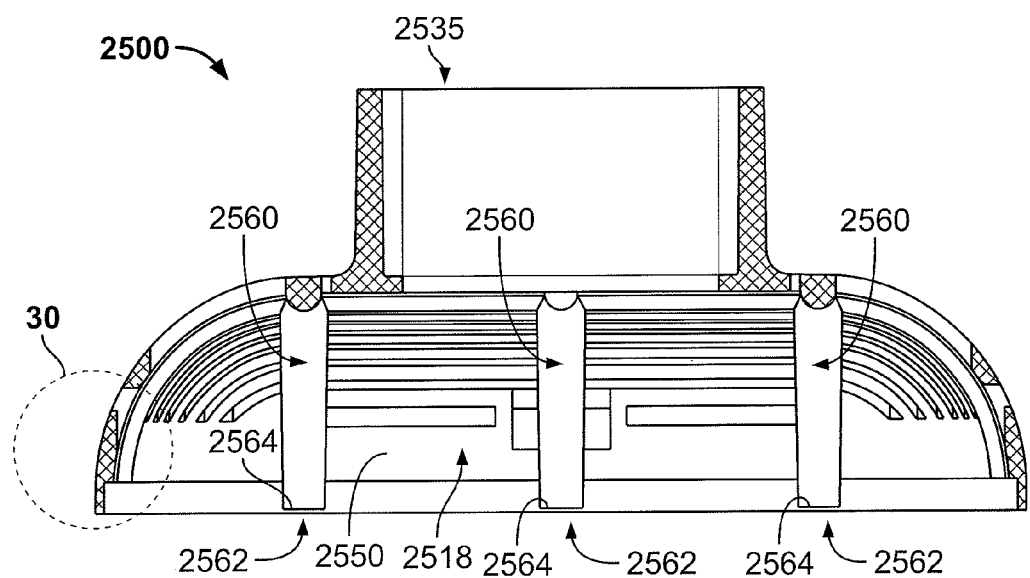
FIG. 28 is a cross-sectional view of the top component of the underdrain along the line 28-28 of FIG. 24.
Figure 30:
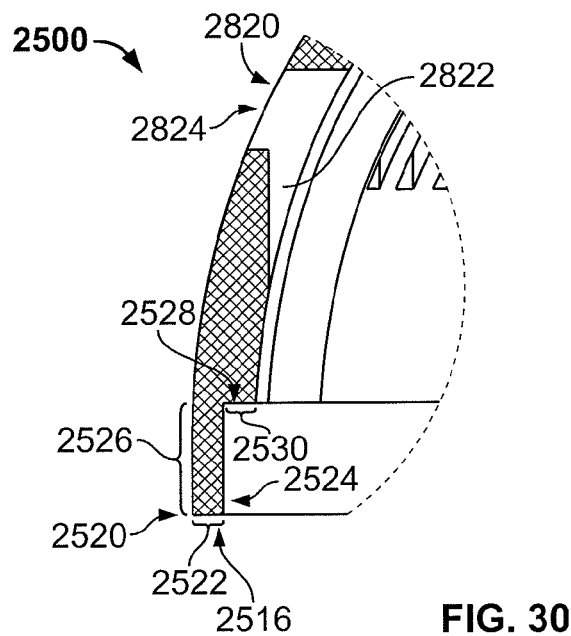
FIG. 30 is a detailed view of area 30 in FIG. 28.

Referring to FIGS. 28 and 30, for example, the tiered edge 2516 can include a first section 2520 that is generally parallel to the planar section 2512 of the outer surface 2510, a second section 2524 that is generally perpendicular to and extends from an inner end of the first section 2520, and a third section 2528 extending generally perpendicularly from the second section 2524 and generally parallel to the first section 2520. The first section 2520 of the tiered edge 2516 can have a width 2522 forming a lip about an outer perimeter of the tiered edge 2516 upon which the first section 2124 of the edge 2116 of the bottom component 2100 can abut when the components 2100 and 2500 are interlocked. The width 2522 of the first section 2520 of the tiered edge 2516 can be substantial equal to the width 2134 of the first section 2124 of the tiered edge 2116. The second section 2524 of the tiered edge 2516 can interlocking interface (e.g., friction fit) with and/or abut the second section 2126 of the tiered edge 2116 when the components 2100 and 2500 are interlocked. A length 2526 of the second section 2524 of the tiered edge 2516 can be substantially equal to the length 2166 of the second section 2124 of the tiered edge 2116. Likewise, the third section 2528 of the tiered edge 2516 can have a width 2530 forming a lip about an inner perimeter of the tiered edge 2516 upon which the third section 2132 of the edge 2116 of the bottom component 2100 can abut when the components 2100 and 2500 are interlocked. The widths of the third sections 2132 and 2528 can be substantially equal.

Figure 25:
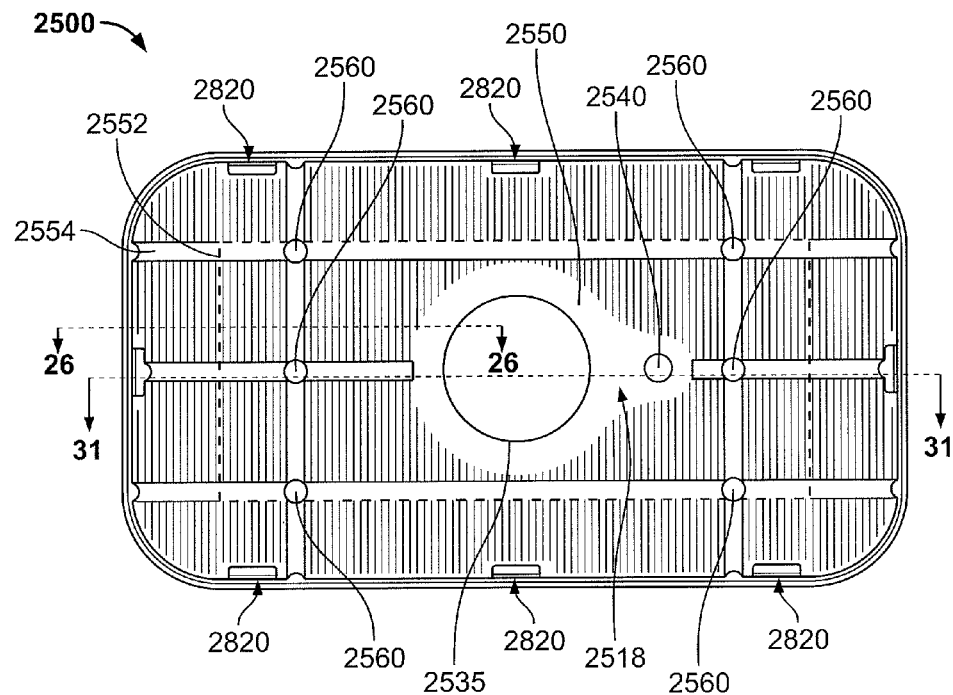
FIG. 25 is a bottom view of the top component of the underdrain of FIG. 23.
Figure 26:
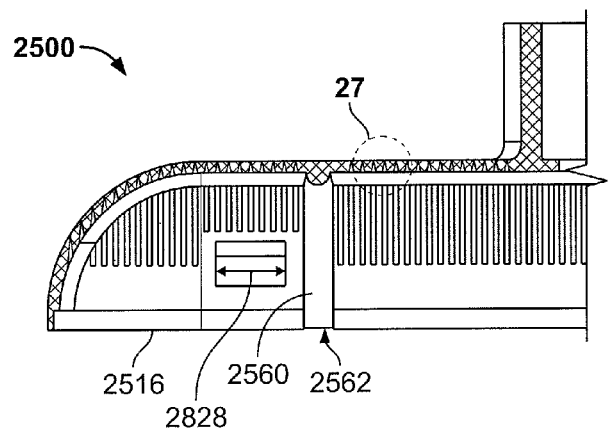
FIG. 26 is a cross-sectional view of the top component of the underdrain along the line 26-26 of FIG. 25.
Figure 29:
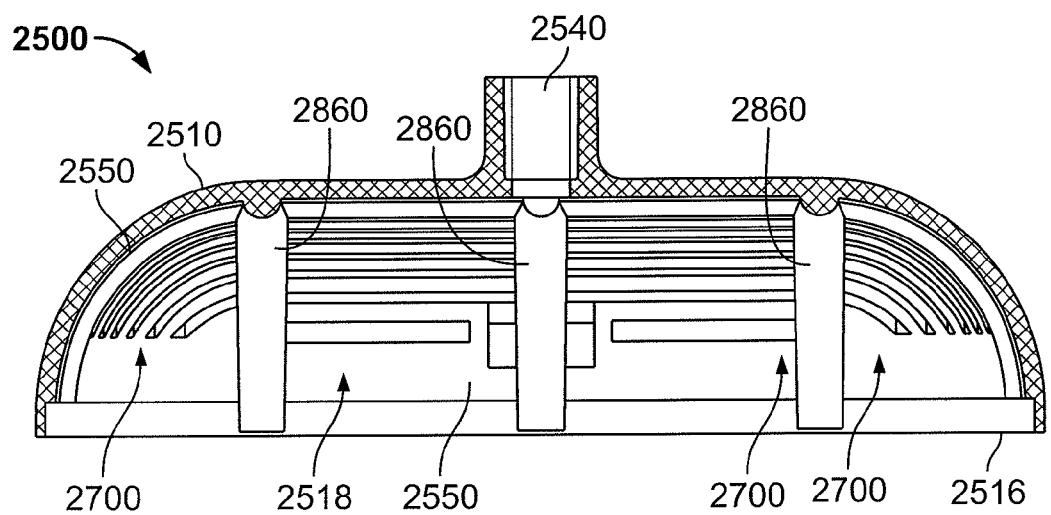
FIG. 29 is a cross-sectional view of the top component of the underdrain along the line 29-29 of FIG. 24.

As shown in FIGS. 25, 28, and 29, for example, the inner surface 2550 of the top component 2500 generally conforms to the outer surface such that the planar section 2512 and curved side section 2514 are reflected as a planar section 2552 and a curved side section 2554 on the inner surface 2550. The bracing members 2560 can extend from the inner surface 2550 into the interior area 2518 of the top component 2500, and in some embodiments, can extend to be substantially flush with the first section 2520 of the tiered edge 2516. The bracing members 2560 can have a generally elongate cylindrical or rod-like body and can extend generally perpendicularly from the inner surface. The bracing members 2560 be configured to be inserted into the recess 2164 of the tip 2162 such that a distal end 2562 of a tip 2564 of the bracing members 2560 of the component 2500 abut the bottom of the recess 2164 in the tip 2162 of the bracing members 2160. When the components 2100 and 2500 are interlocked, the bracing members 2160 and 2560 can form columns extending between the planer sections 2152 and 2552 of the inner surfaces 2150 and 2550, and planer sections 2112 and 2512 and/or planar sections 2152 and 2552 can be generally parallel. The bracing members 2160 and 2560 provide structural support to the underdrain 2000 to reinforce the underdrain 2000. The columns formed by the bracing members when the components 2100 and 2500 are interlocked can be configured to support a load of the filtrate material, such as sand, and water in the filter tank to prevent the underdrain 2000 from collapsing. In exemplary embodiments, the bracing members 2160 and 2560 can be implemented as second inter-component locking structures of the underdrain 2000. For example, the tip 2564 can be configured and dimensioned to fit tightly within the recess 2164 of the tip 2162 such that the tip 2564 forms a friction or interference fit within the recess 2164 and/or deforms or displaces the tip 2162 so that the recess 2164 conforms to the configuration and dimension of the tip 2564.

Figure 24:
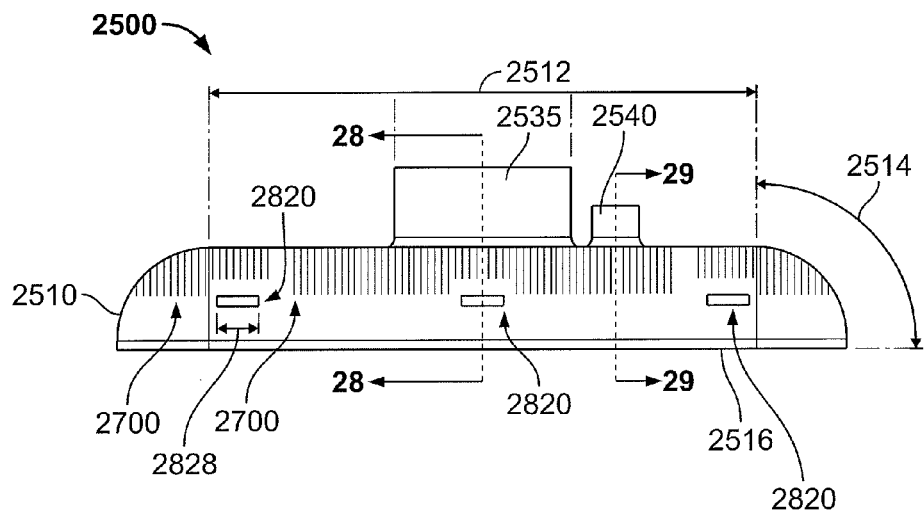
FIG. 24 is a side view of the top component of the underdrain of FIG. 23.
Figure 31:
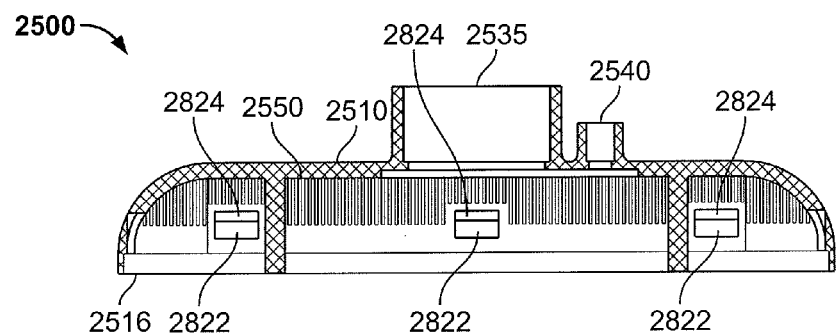
FIG. 31 is a cross-sectional view of the top component of the underdrain along a line 31-31 of FIG. 25.

Still referring to FIG. 13, 23-31, and more particularly to FIGS. 24, 30, and 31, for example, the top component 2500 can include the second locking member 2820 to selectively interlock the top section 2500 to the bottom component 2100. The second locking members 2820 can be formed by channels 2822 and openings 2824. The channels 2822 can be formed on the inner surface 2550 of the top component 2500 and can extend from the edge 2516 towards the planar section 2512 of the top component 2500. The openings 2824 can be disposed at a distal end 2826 of the channels 2822 and can be configured to receive the retaining section 2814 of the first locking members 2810. For example, the openings 2824 can have a width 2828 that is slightly wider than the width 2818 of the first locking members 2810 so that the retaining sections 2814 fits within the openings 2824. To interlock the bottom and top components 2100 and 2500, the retaining section 2814 of the first locking members 2800 slide along the channel 2822 of the second locking member 2820 causing the first locking member 2800 to deflect inwardly towards an interior of the underdrain 2000. Once the retaining section 2814 of the first member reaches the opening 2824 of the second locking member 2820, the first locking member 2800 returns and/or springs back outwardly towards its nominal position so that the lip 2816 of the retaining section extends into the opening 2824 of the second locking members 2820 and catches on an edge of the opening to interlock the components 2100 and 2500 to form the underdrain 2000.

Figure 27:
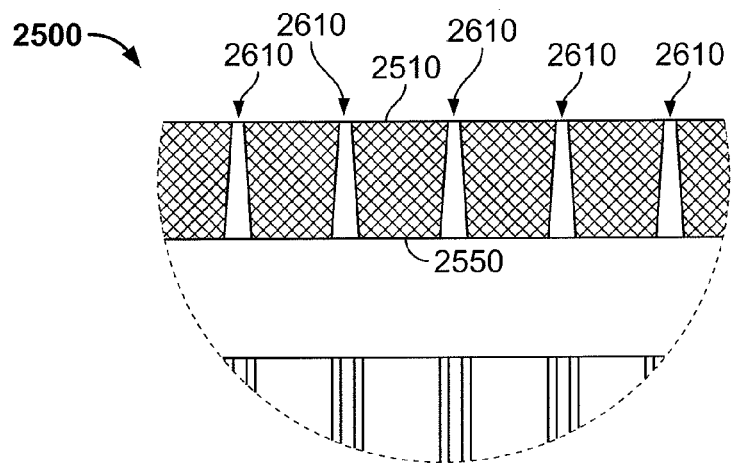
FIG. 27 is a detailed view of area 27 in FIG. 26.

The drainage openings 2700 can be formed during the molding of the top component and can be dimensioned to permit water to pass through the drainage openings 2700, but to prevent filtrate material from passing through the drainage openings 2700. The drainage openings 2700 can be distributed about the outer surface 2510 of the top component 2500. As shown in FIG. 27, for example, the drainage openings 2700 extend through a wall of the top component 2500 defined by the outer and inner surfaces 2510 and 2550 to facilitate communication between an interior and exterior of the underdrain 2000. The drainage openings 2700 can start with a narrow outer opening 2610 in the outer surface 2510 of the top component 2500 can gradually widen towards an inner surface 2550 of the top component 2500 such that the drainage openings 2700 are wider at the inner surface 2550 than at the outer surface 2510 to encourage water to more freely flow into the underdrain 2000 after passing through the outer surface 2510. In some embodiments, the dimensions of the drainage openings 2700 at the outer surface 2510 can permit water to there through, but to prevent filter material from passing there through, while the dimensions of the drainage openings 2700 at the inner surface 2550 can be sized without regard to the dimensions of the filtrate material.

In another exemplary embodiment of the underdrain 2000, as shown in FIGS. 32-47, the underdrain 2000 can include first and second inter-component locking structures 2800*a* and 2800*b* to selectively interlock components 2100' and 2500'. The component 2500' can include first perimeter locking members 2810*a* of the first inter-component locking structure 2800*a*, and the component 2100' can include second perimeter locking members 2820*a* of the first inter-component locking structure 2800*a*. The component 2100' can include, first interior locking members 2810*b*, and the component 2500' can include second interior locking members 2820*b* of the second inter-component locking structures 2800*b*.

Referring to FIGS. 33 and 40-46, the first perimeter locking members 2810*a* of the first inter-component locking structures 2800*a* can be distributed about and inward of and proximate to an inner perimeter of the component 2500', and can be formed to include shoulder portions 2812*a* and solid body projections 2814*a*, such as pins, extending from the shoulder portions 2812*a*. The first perimeter locking members 2810*a* can extend generally perpendicularly to the planar interior surface of the component 2500'. In exemplary embodiments, the projections 2814*a* of the first perimeter locking members 2810*a* can be formed as cylindrical, rod-like structures that have a length 2817*a* and a diameter 2818*a*. The first perimeter locking members 2810*a* can have a rounded distal end 2819*a* to aid in alignment of the first perimeter locking members 2810*a* with corresponding ones of the second perimeter locking members 2820*a*.

Referring to FIGS. 33-39, for example, the second perimeter locking members 2820*a* of the first inter-component locking structures 2800*a* can be formed as projections 2822*a* having a shoulder portion 2813*a* and recesses 2824*a* disposed inward of and proximate to an inner perimeter of the component 2100'. The shoulder portion 2813*a* can provide a surface substantially surrounding the opening of the recess 2824*a* and can provide an area for interfacing with the shoulder 2812*a* of the first perimeter locking member 2810*a*. The recesses 2824*a* can have a depth that corresponds to the length 2817*a* of the first perimeter locking members 2810*a*. The recesses 2822*a* can have a multi-sided configuration such that the shape associated with the recess 2822*a* is different than the shape associated with the first perimeter locking members 2810*a*. In exemplary embodiments, the recess 2822*a* can be configured to be square, pentagonal, hexagonal, heptagonal, octagonal, decagonal, or the like. For example, in the present embodiment, the recesses 2822*a* can have a hexagonal shape. The recesses 2822*a* can have a width 2828*a* that is substantially equal to or less than the diameter 2818*a* of the first perimeter locking members 2810*a* such that the first perimeter locking members 2810*a* fit securely within the second perimeter locking structures 2820*b*.

In exemplary embodiments, as the first perimeter locking structures 2810*a* are inserted into the second perimeter locking members 2820*a*, the shape of the recess 2822*a* can be deformed to accommodate the first locking member 2810*a* to form a friction and/or interference fit between the first and second locking members. For example, the sides of the recess 2822*a* of the second perimeter locking members 2820*a* can be pushed outwardly as the first perimeter locking members 2810*a* are inserted into the recess 2822*a* to accept the first perimeter locking members 2810*a*. In exemplary embodiments, once the projections 2814*a* have been fully inserted into the recesses 2824*a* of the shoulder portions 2812*a* can abut the shoulder portions 2813*a* of the projections 2822*a* so that the first and second perimeter locking members interlock and form a structural support member to reinforce the underdrain.

Still referring to FIGS. 33-39, the first interior locking members 2810*b* of the second inter-component locking structures 2800*b* can be distributed inward of and spaced away from the inner perimeter of the component 2100', and can be formed as projections 2814*b* having a hollow body portion towards a distal end 2819*b* of the projections 2814*b*, such as hollow pins. The first interior locking members 2810*b* can extend generally perpendicularly from the planar interior surface of the component 2100'. In exemplary embodiments, the hollow body projections 2814*b* can be formed as cylindrical, rod-like structures that have a length 2817*b* and an outer diameter 2818*b*. The first interior locking members 2810*b* can have a hallowed cavity that is open at a distal end 2819*b* of the first interior locking members 2810*b*.

Figure 44:
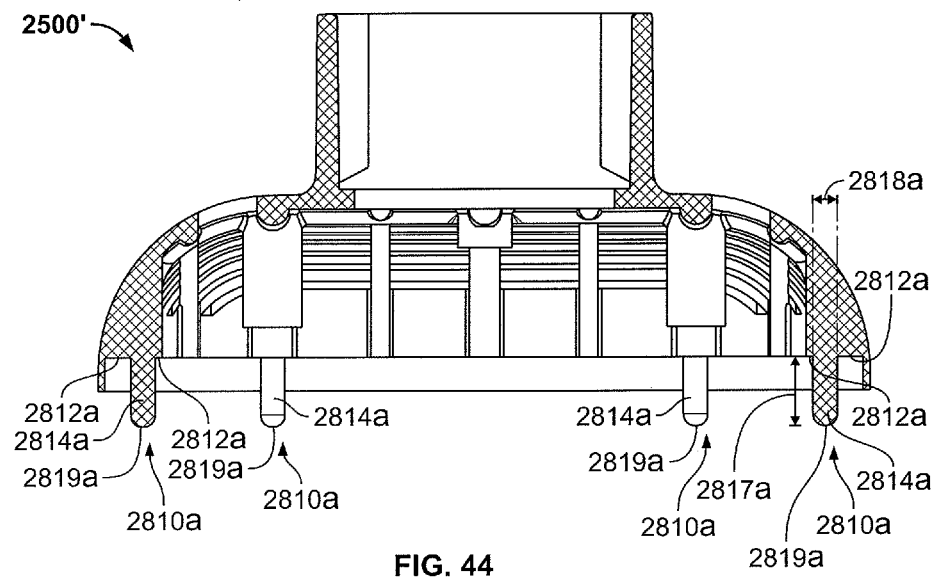
FIG. 44 is a cross-sectional view along line 44-44 of FIG. 40.
Figure 45:
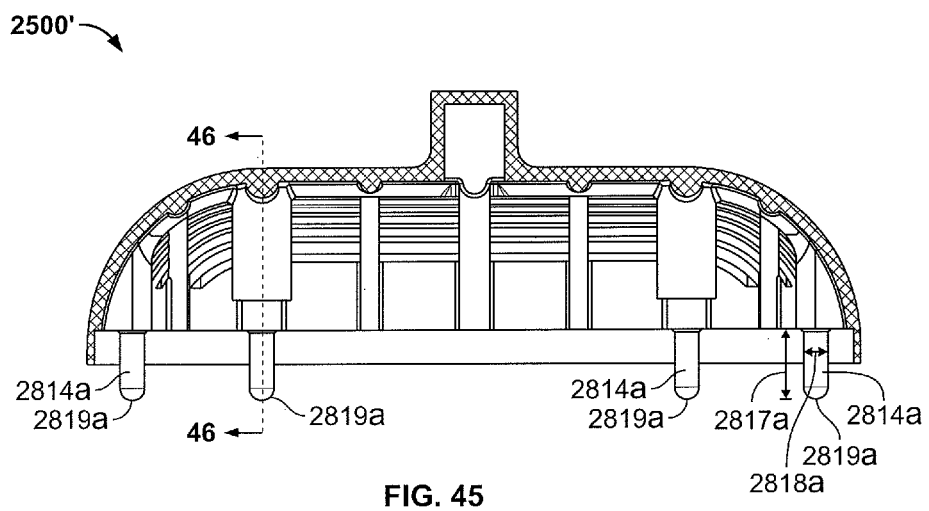
FIG. 45 is a cross-sectional view along line 45-45 of FIG. 40.
Figure 46:
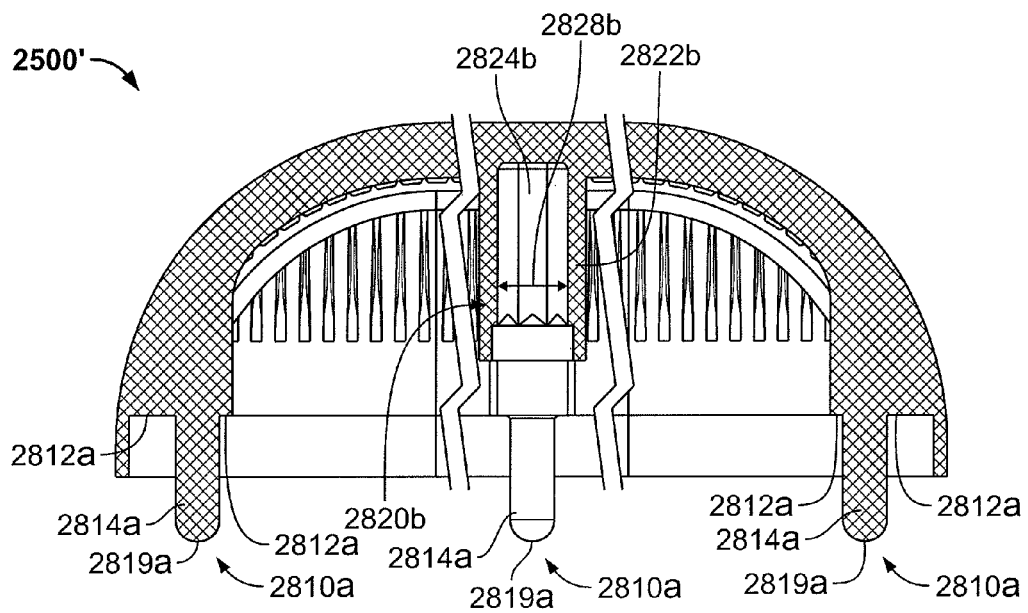
FIG. 46 is a cross-sectional view along line 46-46 of FIG. 45.
Figure 47:
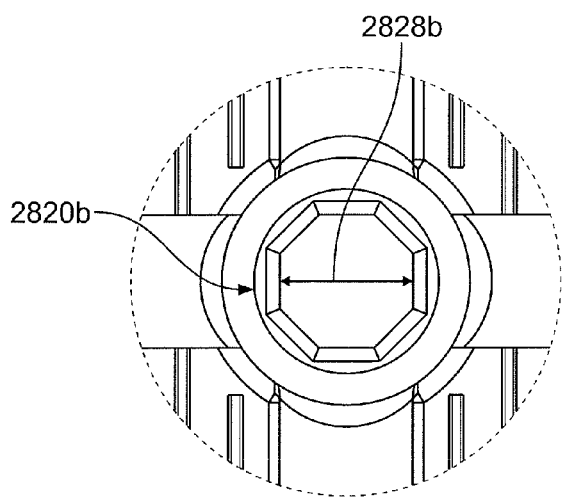
FIG. 47 is a detailed view of area 47 of FIG. 41

Referring to FIGS. 33 and 41-43 and 46, for example, the second interior locking members 2820*b* of the second inter-component locking structures 2800*b* can be formed as projections 2822*b* protruding and/or extending from the planar interior surface of the component 2500' such that the second interior locking members are disposed inward of and spaced away from the inner perimeter of the component 2500'. The projections 2822*a* of the second interior locking members 2820*b* can include recesses 2824*b* in the projections forming receiving areas of the second interior locking members 2820*b*. The recesses 2824*b* can have a depth to accommodate at least a portion of the length 2817*b* of the first interior locking members 2820*b*. The recesses 2824*b* can have a multi-sided configuration, as shown in FIG. 44, for example, such that the shape associated with the recess 2824*b* is different than the shape associated with the first interior locking members 2810*b*. In exemplary embodiments, the recesses 2824*b* can be configured to be square, pentagonal, hexagonal, heptagonal, octagonal, decagonal, or the like. For example, in the present embodiment, the recesses 2824*b* can have a octagonal shaped. The recesses 2824*b* can have a width 2828*b* that is substantially equal to or slightly less than the diameter 2818*b* of the first interior locking members 2810*b* such that the first interior locking members 2810*b* fit securely within the second interior locking structures 2820*b*.

In exemplary embodiments, as the first interior locking structures 2810*b* are inserted into the second interior locking members 2820*b*, the hollow body projections 2812*b* can be compressed inwardly to deform the hollow cavities of the hollow body projections 2812*b* of the first interior locking members 2810*b* so that the first interior locking members fit securely in the second interior locking members to form a friction and/or interference fit between the first and second locking members 2810*b* and 2820*b*, respectively. In exemplary embodiments, once the projections 2814*b* have been fully inserted into the recesses 2824*b*, the first and second interior locking members interlock and form a structural support member to reinforce the underdrain.

Still referring to FIGS. 32-47, and more particularly to FIGS. 35-37 and 41-43, for example, exemplary embodiments can include bracing members 2160*a* and 2160*b* extending generally perpendicularly from the inner planar surface of the component 2100'. The bracing members 2160*a* can have an elongated X-shaped configuration and can extend from the inner planar surface of the component 2100' to a X-shaped receiving area 2560*a* on the inner planer surface of the component 2500' when the components 2100' and 2500' are interlocked so that a distal end of the bracing members 2160*a* engages the receiving area 2560*a* and forms a support structure of the underdrain to prevent the underdrain from collapsing under the load applied to the underdrain in operation. In exemplary embodiments, the receiving area can include a recessed portion and a distal portion of the bracing member 2160*a* can fit within a recessed portion to form a friction or interference fit. In exemplary embodiments, the bracing members 2160*a* and receiving areas 2560*a* can form third inter-component locking structures.

The bracing members 2160*b* can have a generally cylindrical, tapered elongate body and can extend from the inner planar surface of the component 2100' to a receiving area 2560*b* formed in or on the inner planer surface of the component 2500' when the components 2100' and 2500' are interlocked so that a distal end of the bracing members 2160*b* engages the receiving area 2560*b* and forms a support structure of the underdrain to prevent the underdrain from collapsing under the load applied to the underdrain in operation. In exemplary embodiments, the receiving area 2560*b* can have a recessed portion and a distal portion of the bracing member 2160*b* can fit within a recessed portion of the receiving area 2560*b* to form a friction or interference fit. In exemplary embodiments, the bracing members 2160*b* and the receiving areas 2560*b* can form fourth inter-component locking structures.

Figure 32:
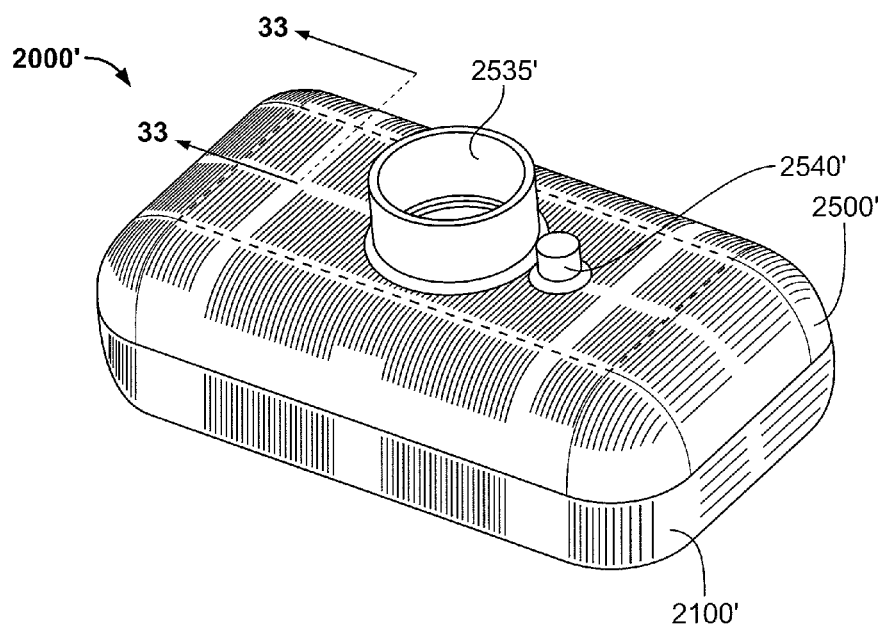
FIG. 32 is a perspective view of another exemplary embodiment of an underdrain.
Figure 33:
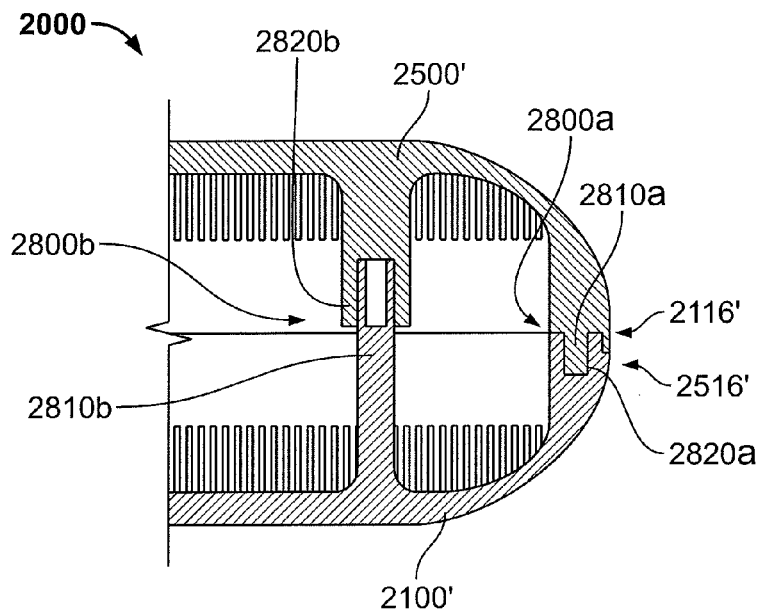
FIG. 33 is a cross-sectional view of the assembled underdrain of FIG. 32 along line 33-33.
Figure 34:
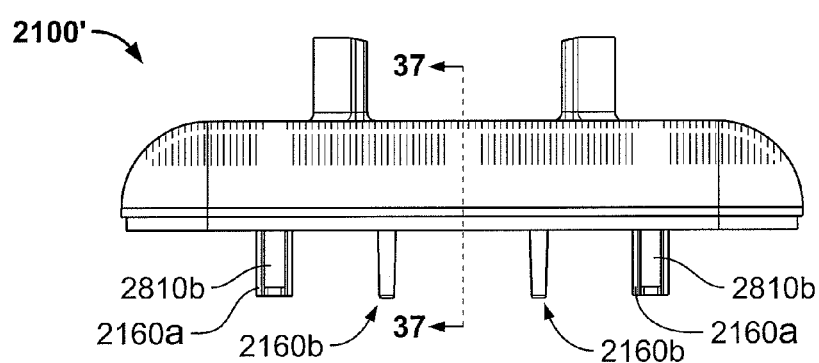
FIG. 34 is a side view of the bottom component of the underdrain of FIG. 32.
Figure 35:
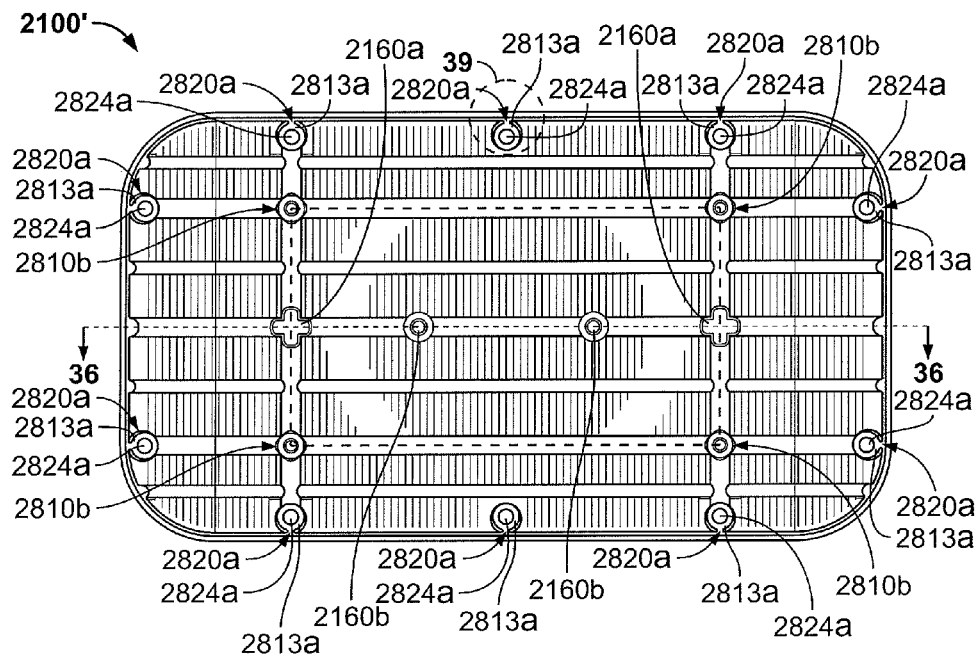
FIG. 35 is a top view of the bottom component of FIG. 32.
Figure 36:
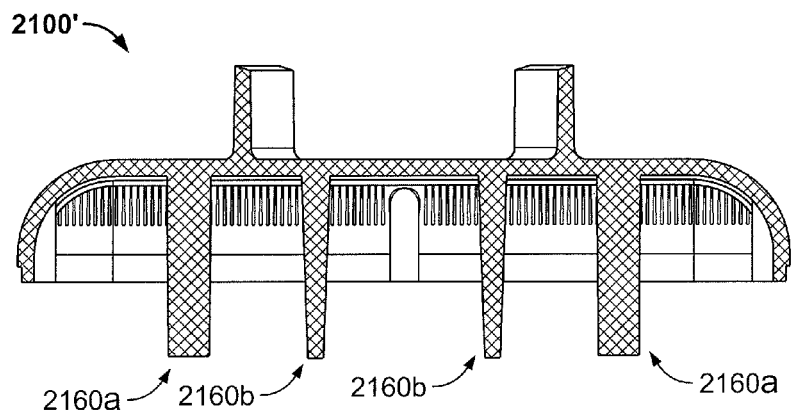
FIG. 36 is a cross-sectional view along the line 36-36 of FIG. 35.
Figure 37:
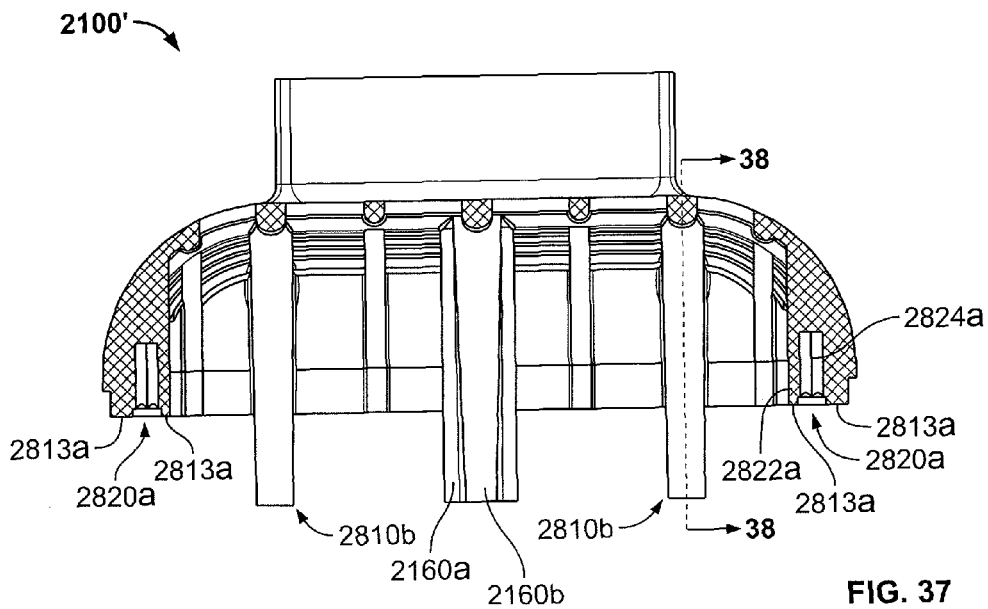
FIG. 37 is cross-sectional view along line 37-37 of FIG. 34.
Figure 38:
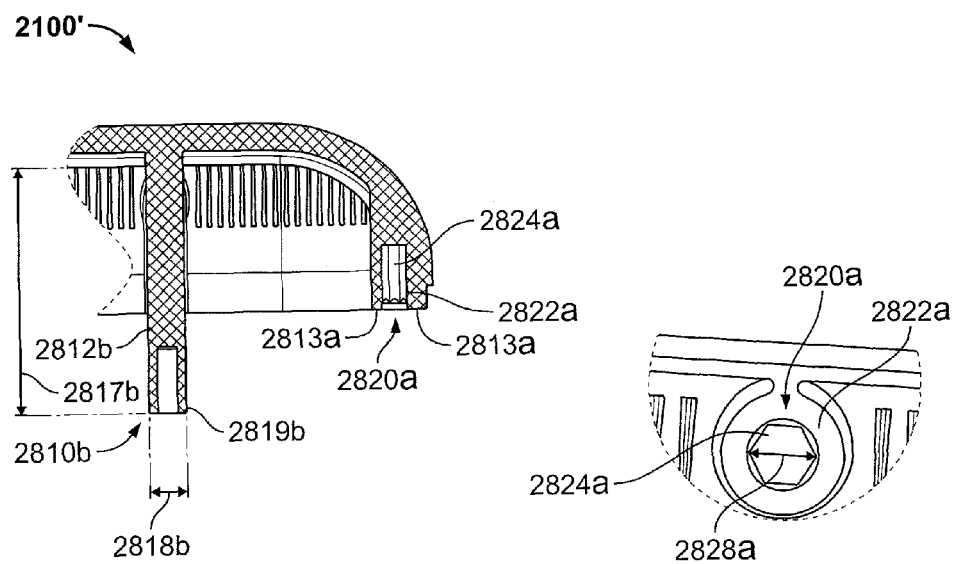
FIG. 38 is a cross-sectional view along line 38-38 of FIG. 37.
Figure 39:
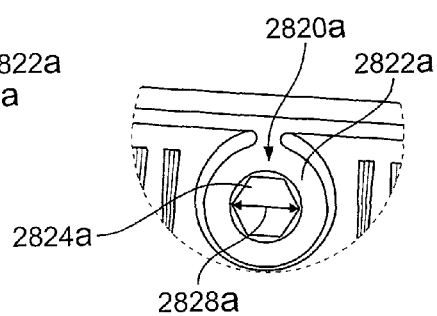
FIG. 39 is a detailed view of area 39 of FIG. 35.
Figure 40:
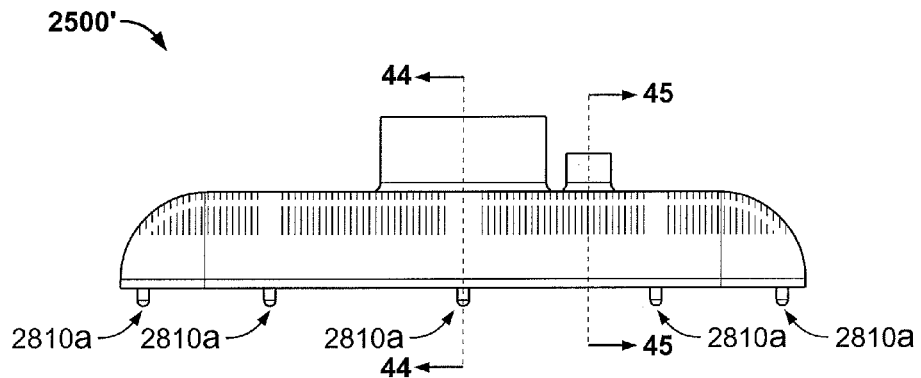
FIG. 40 is a side view of the top component of the underdrain of FIG. 32.
Figure 41:
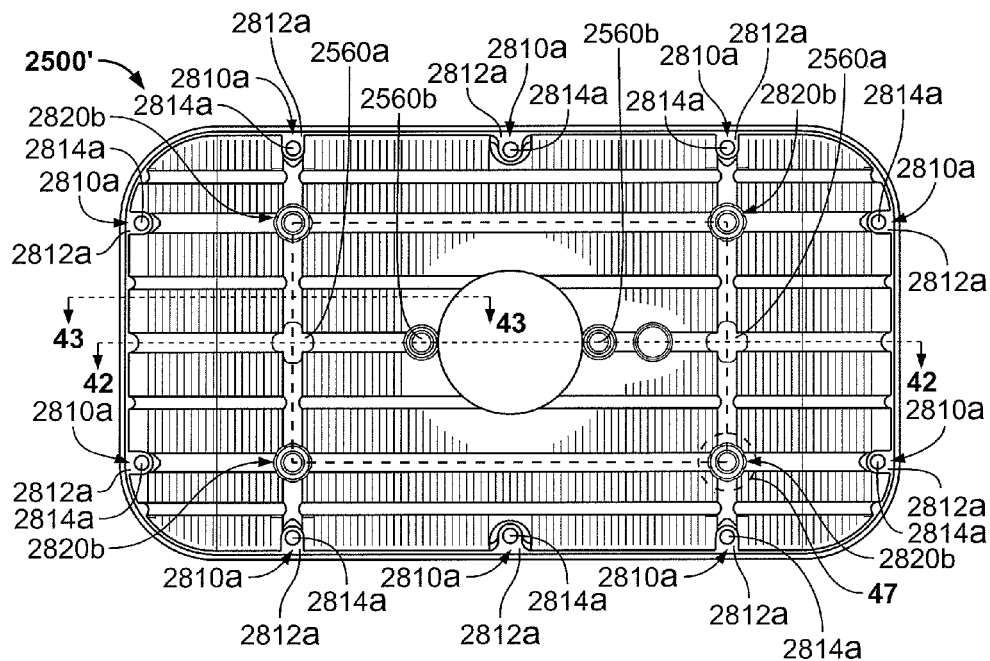
FIG. 41 is a bottom view of the top component of FIG. 32.
Figure 42:
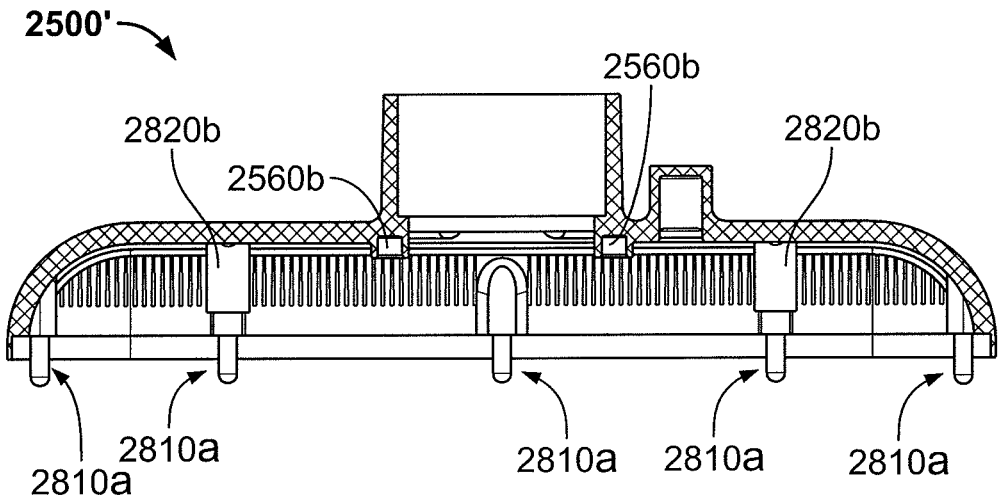
FIG. 42 is a cross-sectional view along the line 42-42 of FIG. 41.
Figure 43:
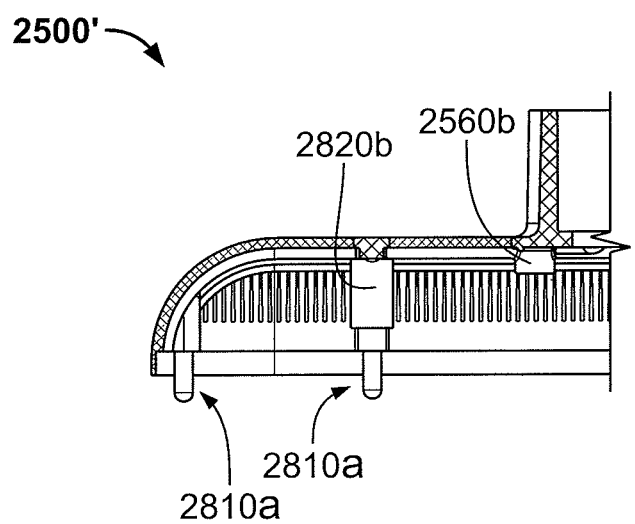
FIG. 43 is a cross-sectional view along the line 43-43 of FIG. 41.

As shown in FIG. 32, the port 2540' can be formed to be closed off such that venting is accomplished through the center port 2535' for arrangement in which the outlet port is at the top of the filter tank. For embodiments, in which the outlet port is positioned on a side of the filter tank the port 2540' can be drilled or other opened to allow venting through the port 2540'.

In an exemplary operation, pool water flows into the filter unit 100 from a swimming pool via a water circulation system, which can include one or more pumps positioned upstream and/or downstream of the filter unit 100. Water flowing into the filter unit 100 can pass through the inlet port and the diffuser, and can percolate through the filtrate material, such as sand, to an exemplary embodiment of the presently disclosed underdrain, which collects filtered pool water for recirculation in the pool by the water circulation system. The filtered water can be output from the filter unit 100 to the pool via an outlet port of the filter unit 100. During the circulation of the pool water, the water can pass through other water processing components. For example, the water can pass through a basket or skimmer component configured to remove large debris, such as leaves, from the water prior to entering the filter unit 100 and/or may pass through one of more water heating elements to heat the water.

In an exemplary backflow operation, the flow of the water is reversed by actuation of a multi-port valve such that the water flows into the filter unit 100 via the outlet port 3120. The water entering the filter unit 100 via the outlet port 3120 flows through the recirculation pipe 3300 into the underdrain and from an interior of the underdrain to an exterior of the underdrain. The backwash operation can function to clean the drainage openings of the underdrain by dislodging particles stuck in the drainage openings. Thus, the backwash operation can be used on occasion to improve the filtration and efficiency of the filter unit.

Experiments were performed in which both a conventional lateral underdrain assembly, such as a conventional lateral underdrain having a similar configuration to that of the lateral underdrain assembly disclosed in U.S. Pat. No. 5,068,033 and an exemplary embodiment of the underdrain of the present disclosure were tested. Experiments were performed using a flat bottom tank with two returns, a skimmer, a 8" Hayward suction outlet connected to the filter with piping, and a Hayward TriStar pump with a Hayward Variable Speed Controller. The underdrains were set up on a spacer consisting of a piece of cartridge core to enable flow through the bottom of the underdrain.

Figure 48:
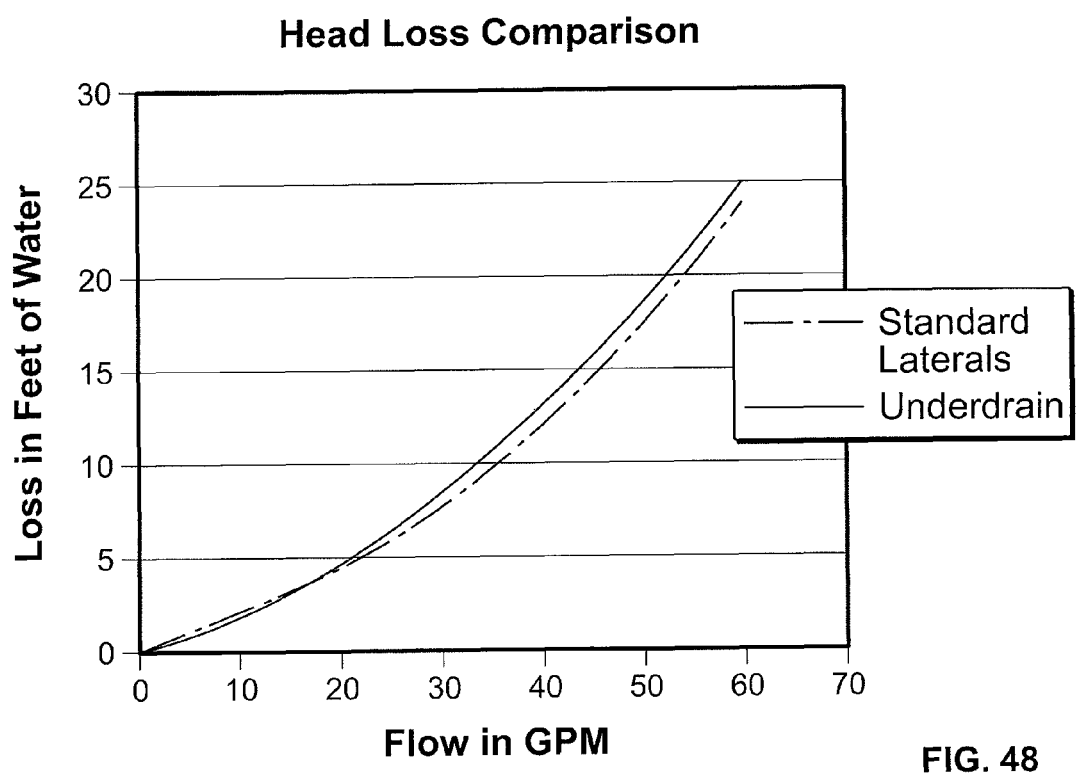
FIG. 48 is a graph of pressure loss for a conventional lateral underdrain assembly and for an exemplary underdrain of the present disclosure.

In a first experiment, pressure drop of the conventional lateral underdrain assembly and the exemplary embodiment of the underdrain of the present disclosure was compared. As shown in FIG. 48, the pressure loss and a corresponding flow loss between an embodiment of underdrain and the conventional lateral underdrain assembly was comparable. After backwashing, both the underdrains returned to the initial readings of flow and head loss.

Figure 49:
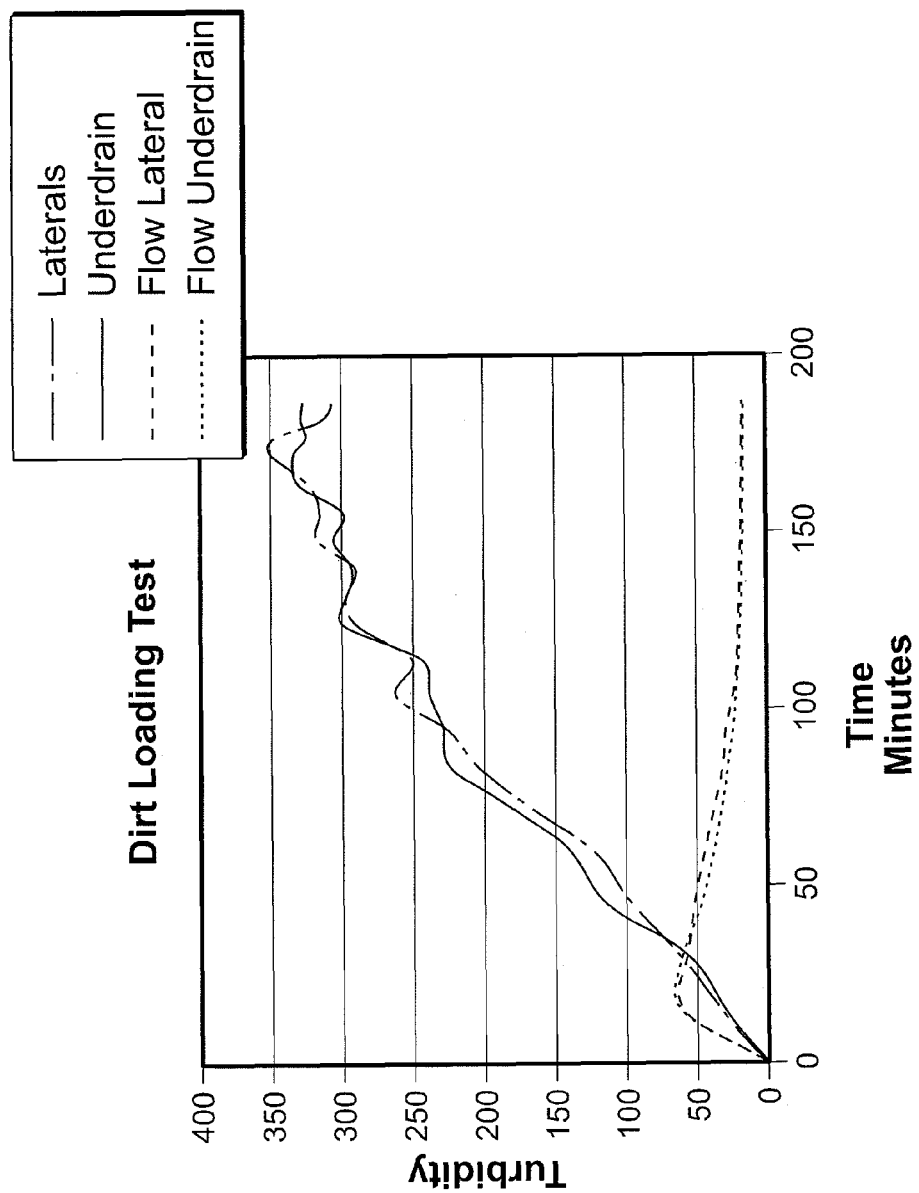
FIG. 49 is a graph of experimental results for a dirt loading test.
Figure 50:
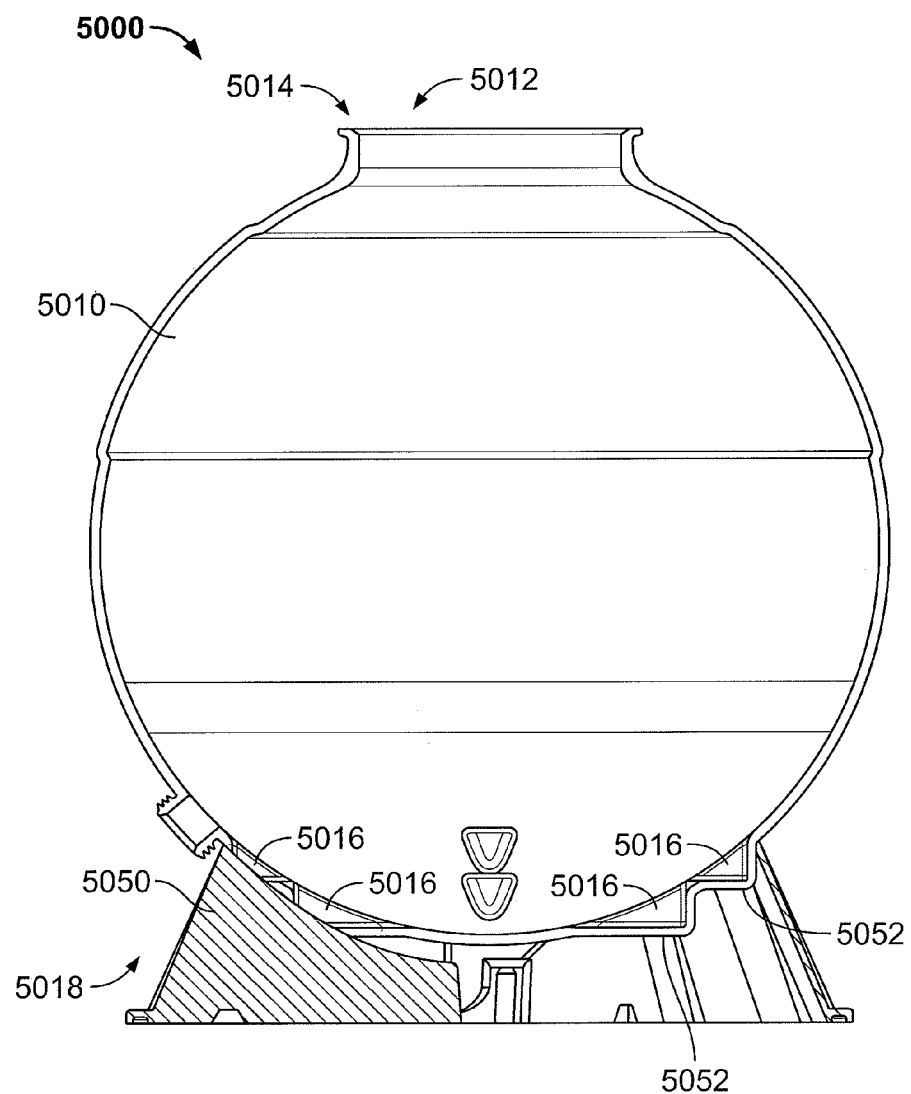
FIG. 50 is a prior art filter tank assembly having a housing with a separately attachable base section.
Figure 51:
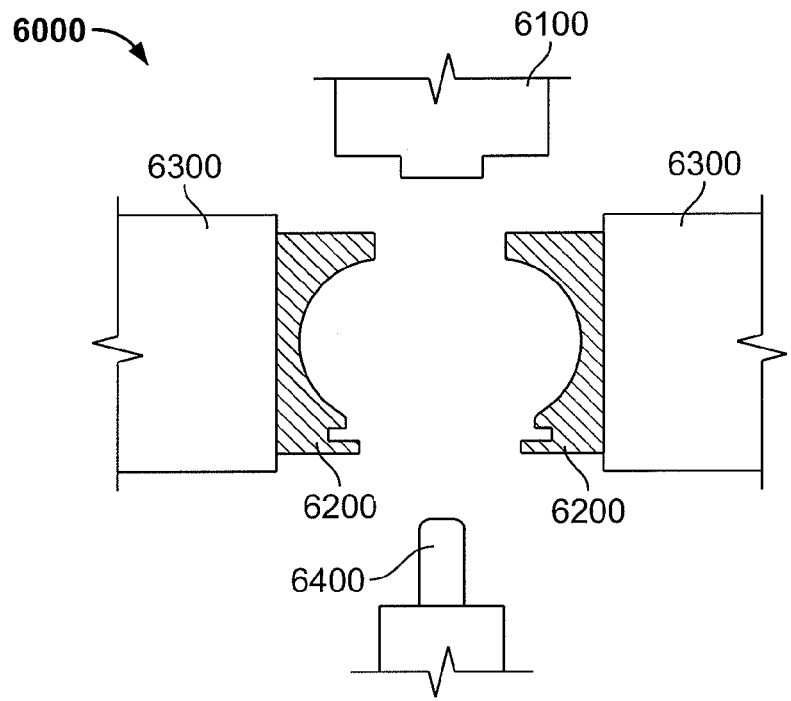
FIGS. 51-55 show a prior art system and process for forming a filter tank of FIG. 50.
Figure 52:
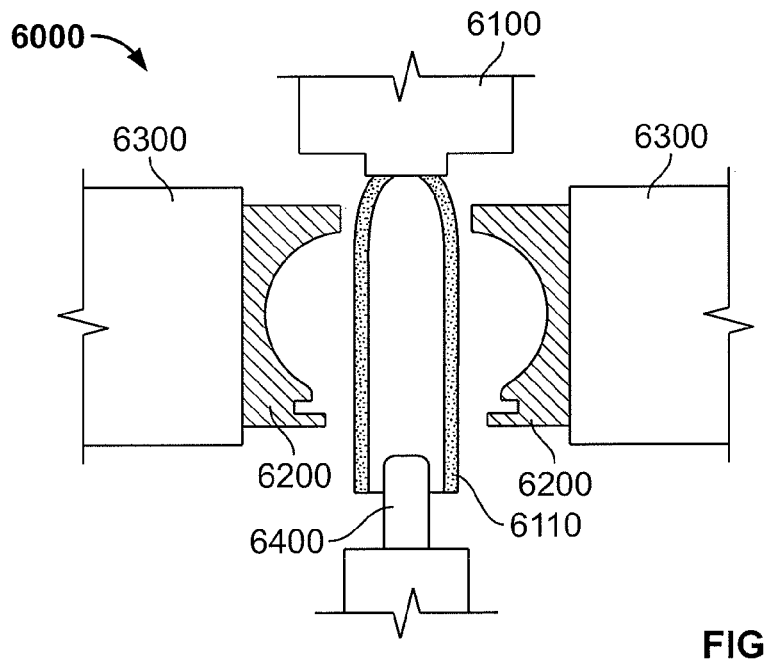
Figure 53:
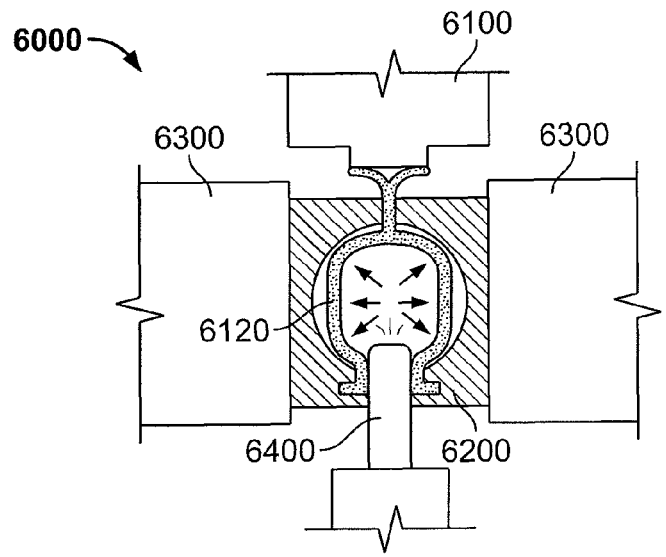
Figure 54:
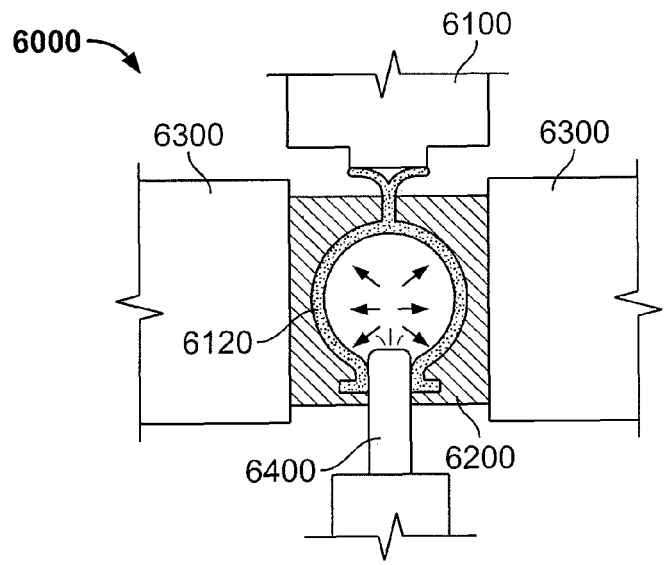
Figure 55:
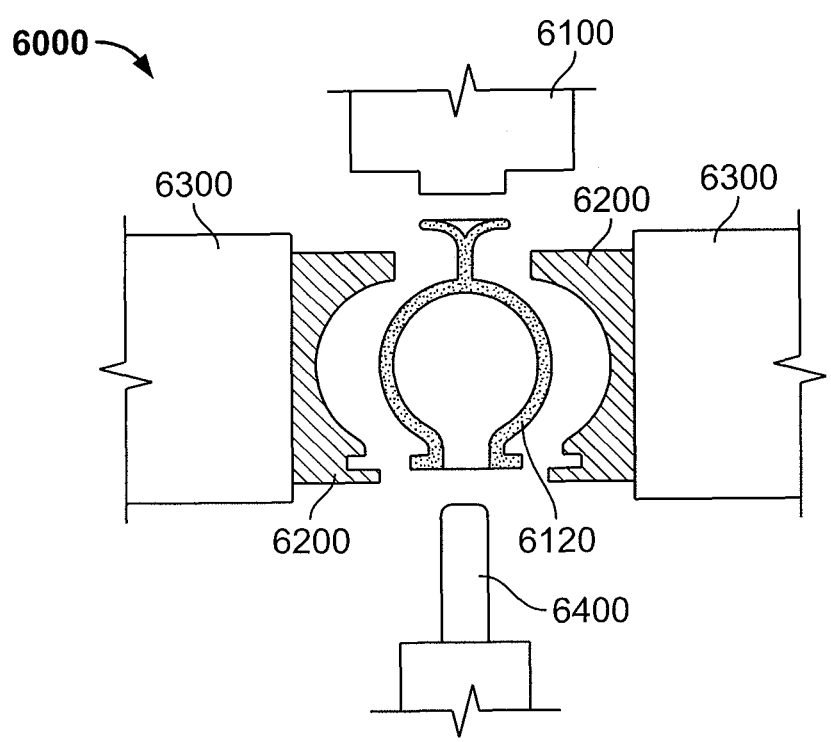

In a second experiment, a dirt loading was conducted, in which dirt is added to the filter to simulate excess dirt loading. As shown in FIG. 49, the second experiment indicated that both underdrains in a clean sand filter that was dirt loaded had about the same flow capacity and about the same pressure drop. There was no apparent "channeling" in the sand after the dirt loading test and backwashing, and the sand distribution after the backwashing appeared to be fairly uniform.

Thus, exemplary embodiments of the present disclosure perform comparably to a conventional lateral underdrain assembly. However, exemplary embodiments of the underdrains of the present disclosure can be manufactured at a reduced cost and can reduce installation times when compared to the conventional lateral underdrain assembly because exemplary embodiments of the underdrains include a reduced number of individually manufactured components that must be assembled. Furthermore, in exemplary embodiments of the present disclosure, the underdrain 2000 can be preassembled external to a filter tank and can be seated in the filter tank as an assembled unit without having to manipulate, adjust, reconfigure, or the like, the structure of the underdrain 2000.

While preferred embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

What is claimed is:

1. An underdrain for a pool filter comprising:
a first component; and
a second component selectively interlocking with the first component to form an interior area of the underdrain, each of the first and second components having a plurality of drainage openings, each of the drainage openings opening into the interior area of the underdrain and permitting fluid communication between an exterior of the underdrain and the interior area,
wherein the first component includes a first bracing member extending from an inner surface of the first component into an interior area of the underdrain so that a tip of the first bracing member extends into the second component, and the second component includes a second bracing member extending from an inner surface of the second component into the interior area of the underdrain, the tip of the first bracing member having a recess for receiving a tip of the second bracing member so that the second bracing member engages the first bracing member to form a support column extending between the inner surface of the first component and the inner surface of the second component.

2. The underdrain of claim 1, wherein the first component includes a first locking member and the second component includes a second locking member, the first locking member including a projection that engages a recess of the second locking member, the first locking member deforming the recess of the second locking member to form an interference fit between the first and second locking members.

3. The underdrain of claim 1, wherein the plurality of drainage openings are dimensioned to permit water to pass through, but to prevent filtrate material from passing through, the drainage openings being distributed about an outer surface of the first and second components, the drainage openings extending through a wall of the first and second components defined by the outer and inner surfaces of the first and second components to facilitate fluid communication between an exterior and interior of the underdrain, the drainage openings being tapered such that the drainage openings have a narrow outer opening in the outer surface of the first and second components and a wider inner opening in an inner surface of the first and second components.

4. The underdrain of claim 3, wherein the filtrate material is sand.

5. The underdrain of claim 1, wherein the second component includes a venting port to vent the interior area of the underdrain to atmosphere.

6. The underdrain of claim 1, wherein the underdrain is formed of at least one of polystyrene and polypropylene.

7. An underdrain for a pool filter comprising:
a first component; and
a second component selectively interlocking with the first component to form an interior area of the underdrain, each of the first and second components having a plurality of drainage openings, each of the drainage openings opening into the interior area of the underdrain and permitting fluid communication between an exterior of the underdrain and the interior area,
wherein the first component includes a first locking member distributed inward of, and proximate to, an edge of the first component, and the second component includes a second locking member having a channel and an opening disposed at a distal end of the channel, the first locking member forming a resilient projection having a body section and a retaining section, the retaining section protruding from the body section to provide a lip, the channel of the second locking member being formed on an inner surface of the second component and extending to the opening disposed at the distal end of the channel, the retaining section of the first locking member being configured to slide along the channel causing the first locking member to deflect inwardly towards an interior area of the underdrain, the first locking member returning to a nominal position when the retaining section reaches the opening so that the lip of the retaining section extends into the opening and catches on an edge of the opening to interlock the first and second components of the underdrain.

8. The underdrain of claim 7, wherein the plurality of drainage openings are dimensioned to permit water to pass through, but to prevent filtrate material from passing through, the drainage openings being distributed about an outer surface of the first and second components, the drainage openings extending through a wall of the first and second components defined by the outer and inner surfaces of the first and second components to facilitate fluid communication between an exterior and interior of the underdrain, the drainage openings being tapered such that the drainage openings have a narrow outer opening in the outer surface of the first and second components and a wider inner opening in an inner surface of the first and second components.

9. The underdrain of claim 8, wherein the filtrate material is sand.

10. The underdrain of claim 7, wherein the second component includes a venting port to vent the interior area of the underdrain to atmosphere.

11. The underdrain of claim 7, wherein the underdrain is formed of at least one of polystyrene and polypropylene.

\* \* \* \* \*